US012713048B2

(12) United States Patent
Spreij

(10) Patent No.: US 12,713,048 B2
(45) Date of Patent: Aug. 18, 2026

(54) DECODING TEXELS FROM A BLOCK OF ENCODED TEXTURE DATA

(71) Applicant: Imagination Technologies Limited, Kings Langley (GB)

(72) Inventor: Tijmen Spreij, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 18/928,362

(22) Filed: Oct. 28, 2024

(65) Prior Publication Data

US 2025/0168375 A1 May 22, 2025

(30) Foreign Application Priority Data

Oct. 27, 2023 (GB) ..................................... 2316470

(51) Int. Cl.
*H04N 19/44* (2014.01)
*H04N 19/167* (2014.01)
*H04N 19/176* (2014.01)

(52) U.S. Cl.
CPC ........... *H04N 19/44* (2014.11); *H04N 19/167* (2014.11); *H04N 19/176* (2014.11)

(58) Field of Classification Search
None
See application file for complete search history.

(56) References Cited

U.S. PATENT DOCUMENTS 5,528,741 A * 6/1996 Lucas ..................... H03M 7/24 345/593
6,014,723 A * 1/2000 Tremblay ............ G06F 12/1441 712/E9.082
10,937,198 B2 3/2021 Rovers et al.
2018/0315218 A1* 11/2018 Rovers .................. G06T 11/001
(Continued)

FOREIGN PATENT DOCUMENTS

GB 2562041 A 11/2018

OTHER PUBLICATIONS

Arm-Nystad (NPL: "Adaptive Scalabel Texture Compression," High Perforance Graphics 2012) (Year: 2012).*
(Continued)

*Primary Examiner* — Shadan E Haghani
(74) *Attorney, Agent, or Firm* — Potomac Law Group, PLLC; Vincent M DeLuca

(57) ABSTRACT

A decoder for decoding texels of a p by q sub-block from a block of ASTC encoded texture data representing an n by m block of texels, where p≤n and q≤m. The decoder determines a position of a first texel of the sub-block with respect to the rows and/or columns of a weight grid comprising a first plurality of weights in a first plane; determines a position of a second texel of the sub-block with respect to the rows and/or columns of the weight grid; compares the positions of the first and second texels; extracts fewer than (p+1)(q+1) weights in response to determining that the positions of the first and second texels are between the upper-most and lower-most rows of a predetermined number (Continued)

of adjacent rows of the weight grid and/or the left-most and right-most columns of a predetermined number of adjacent columns of the weight grid; and decodes the texels in dependence on the extracted weights.

18 Claims, 8 Drawing Sheets

(56) References Cited

U.S. PATENT DOCUMENTS

| | | | |
|---|---|---|---|
| 2021/0150777 | A1 | 5/2021 | Rovers et al. |
| 2021/0295588 | A1 | 9/2021 | Foo et al. |

OTHER PUBLICATIONS

Arm Developer Guide (NPL: "Adaptive Scalable Texture Compression Developer Guide Version 4.3," Mar. 2023) (Year: 2023).*
Garrard, Khronos Data Format Specification, The Khronos Group Inc., Version 1.3.1, Apr. 3, 2020, pp. 1-281.
Rovers et al., "On Improving the Performance Per Area of ASTC with a Multi-Output Decoder," 2017 IEEE 24th Symposium on Computer Arithmetic, IEEE Computer Society 2017, pp. 58-59.
Ellis et al; "ASTC Specification"; URL:https://github.com/ARM-software/astc-encoder/blob/master/Documentation/ASTC%20Specification%201.0.pdf; Jul. 19, 2012; pp. 1-31.

* cited by examiner

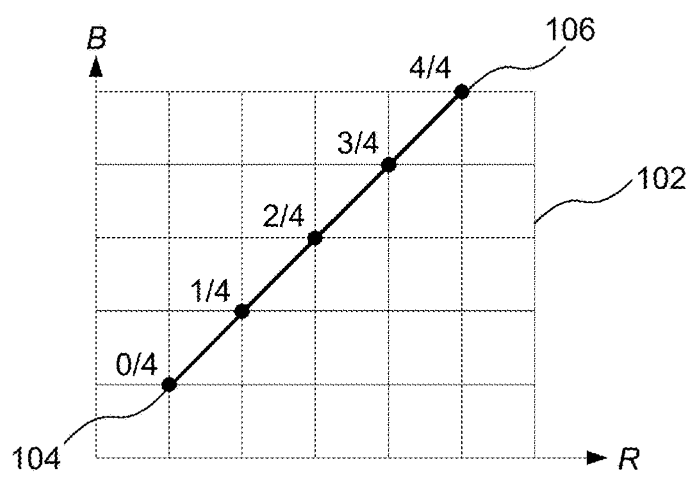
FIGURE 1A
108
| 0/4 | 2/4 | 1/4 | 2/4 |
| --- | --- | --- | --- |
| 1/4 | 1/4 | 2/4 | 0/4 |
| 3/4 | 0/4 | 0/4 | 4/4 |
| 0/4 | 0/4 | 3/4 | 4/4 |
FIGURE 1B
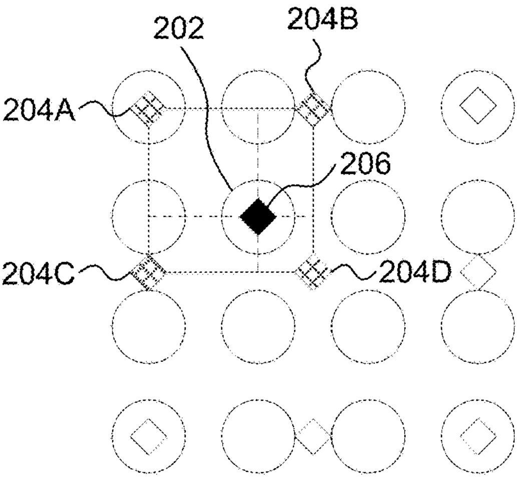
FIGURE 2

DECODING TEXELS FROM A BLOCK OF ENCODED TEXTURE DATA

CROSS-REFERENCE TO RELATED APPLICATIONS AND CLAIM OF PRIORITY

This application claims foreign priority under 35 U.S.C. 119 from United Kingdom patent application No. 2316470.0 filed on 27 Oct. 2023, the contents of which are incorporated by reference herein in their entirety.

TECHNICAL FIELD

The present disclosure is directed to a decoder configured to decode a plurality of texels from a block of texture data encoded according to the Adaptive Scalable Texture Compression (ASTC) format, and a method of decoding a plurality of texels from a block of texture data encoded according to the ASTC format.

BACKGROUND

Textures are used heavily within the field of graphics processing. Textures may be used to represent surface properties, illumination (e.g. within the environment of a scene being imaged) or to apply surface detail to an object being rendered. Textures may require relatively large amounts of memory storage, and texture accesses can contribute a significant proportion of a graphics device's memory bandwidth. As such, it is often desirable to compress texture data.

One texture compression format is known as Adaptive Scalable Texture Compression (ASTC). The ASTC compression format is defined in the ASTC specification. In ASTC, a compressed image, or texture, is subdivided into a plurality of blocks of texture data, where each data block represents the texture data for a block of texels forming the texture. Each block of texture data has a fixed memory footprint (i.e. has a fixed size) of 128 bits. However, the data blocks are capable of representing the texture data for a varying number of texels. The number of texels represented by a single data block may be referred to as the block footprint. The block footprint may be fixed for a given texture. The block footprint's height and width (in texels) are generally selectable from a number of predefined sizes. The footprint may be rectangular, and in some cases the block's footprint may be square. For 2-D textures, examples of block footprints include 4×4 texels; 6×6 texels; 8×8 texels and 12×12 texels (giving compression rates of 8 bits per pixel (bpp); 3.56 bpp; 2 bpp and 0.89 bpp respectively).

The colour of each texel in within a block is defined as a point on a linear gradient between a pair of colours. This pair of colours is referred to as a pair of "colour endpoints". Colours for each texel can be calculated by interpolating between a pair of colour endpoints. An interpolant weight can be used to specify a weighted average of the two colour endpoints (i.e. the position on the linear gradient between those colour endpoints) to thereby define the colour for that texel. This process is illustrated schematically in FIG. 1A, which shows a pair of colour endpoints A (denoted 104) and B (denoted 106) in a red-blue (RB) colour space denoted 102. In this example, each texel can have one of five weights: 0/4 (corresponding to colour A); 1/4; 2/4; 3/4; or 4/4 (corresponding to colour B). An example of the texel weights for each texel of a 4 by 4 block denoted 108 is shown in FIG. 1B. Though shown for the simple example of an RB colour space, the same approach is applied when working in different colour spaces such as RGB or RGBA.

When decoding a texel, colour values are decoded from the data block and those values are then converted into colour endpoints. The way colour values are converted into colour endpoints is defined by an algorithm known as the colour endpoint mode. Information on the colour endpoint mode for a texel is encoded within the data block. The ASTC specification defines 16 possible colour endpoint modes, which vary from computing a pair of colour endpoints from two colour values up to computing a pair of colour endpoints from eight colour values.

In certain cases, a single pair of colour endpoints can be used to calculate the colour for each texel within a data block. However, in other cases, a block may represent texels which have a mixture of different colours that cannot reasonably be represented by interpolating between a single pair of colour endpoints. To get around this problem, each texel in the data block can be assigned to one of up to four partitions, where each partition is associated with its own colour endpoint pair. To determine the colour of a texel within the block, the partition that the texel belongs to is determined and the colour calculated using the interpolant weight for that texel and the colour end point pair associated with the partition. The interpolant weight can be stored and encoded within the data block independently of the colour end point pair (i.e. independently of the partition to which the texel belongs).

This is illustrated schematically in FIGS. 3A and 3B. FIG. 3A shows a first colour endpoint pair 302 formed of endpoint colours A and B, and a second colour endpoint pair 304 formed of endpoint colours C and D within an RB colour space 306. The first endpoint pair belongs to a first partition and the second endpoint pair belongs to a second partition. Thus in this example there are two partitions. Each colour endpoint pair can be interpolated between with five weights. FIG. 3B shows a block of texels 308 represented by a block of texture data. A partitioning mask is shown overlaid on the block of texels indicating which partition each texel belongs to. The partitioning mask is a grid of values, where each value indicates which partition a texel belongs to. Each value may as such be referred to as a partition index. In particular, a value of 1 indicates a texel belongs to the first partition (associated with colour endpoint pair 302); and a value of 2 indicates a texel belongs to the second partition (associated with colour endpoint pair 304). The interpolant weights for each texel are also shown. To determine the colour for a texel, the partition index is used to identify the colour endpoint pair, and the interpolant weight is used to interpolate between that pair. For example, texel 310 has a partition index of 1, and an interpolant weight of 3/4 and thus has a colour defined by the position 312 in RB colour space. Texel 314 has a partition index of 2 and an interpolant weight of 1/4 and so has a colour defined by the position 316 in RB colour space.

The interpolant weights may be stored in the form of a weight grid—e.g. a 2-D grid of weight values—that is also encoded within the data block. In certain encodings, an interpolant weight may be stored for each texel in the data block. That is, the number of weights in the weight grid may correspond to the number of texels in the data block. In other words, the dimensions of the weight grid may correspond to the dimensions of the block footprint. Alternatively, a sparser weight grid may be stored that contains fewer weights than the number of texels represented by each data block. That is, the dimensions of the weight grid may differ from the dimensions of the block footprint. This alternative may be used, for example, when there is not enough data within the block to store an interpolant weight for each texel—e.g. for data blocks that represent texture data for a larger number of texels (e.g. 12×12 texels).

In this alternative, an interpolant weight for each texel in the data block can be calculated by interpolating between weights of this sparser weight grid. In order to do this, for a texel, the position of that texel with respect to the weight grid is first determined. This can be achieved by scaling a coordinate position of that texel that is defined according to the dimensions of the block footprint to a coordinate position for that texel that is defined with respect to the dimensions of weight grid. The position of the texel with respect to the weight grid can then be used to select a subset of weights of the weight grid, and to interpolate between those weights to calculate an interpolant weight for the texel. For example, the four weights from a weight grid that are closest to (e.g. surround, or are the nearest neighbours to) that texel may be selected and interpolated between to calculate the interpolant weight for a texel.

By way of example, FIG. 2 illustrates the determination of an interpolant weight for a texel using a subset of weights selected from a weight grid. FIG. 2 shows the positions of texels (shown as circles) of a data block having a 4 by 4 block footprint with respect to the weights (shown as diamonds) of a 3 by 3 grid of weights. The position of each of the texels with respect to the weight grid has been determined. In FIG. 2, using zero indexing, (3,3) is the maximum coordinate position (u,v) in the block of texels, and (2,2) is the maximum coordinate position (x,y) in the weight grid. So, the coordinate position (u,v) of each texel defined according to the dimensions of the block footprint can be scaled by a scaling factor of 2/3 in both directions to determine a coordinate position (x,y) for that texel that is defined with respect to the dimensions of weight grid. For example, texel 202 has a coordinate position of (1,1) defined according to the dimensions of the block footprint. That coordinate position can be scaled by the scaling factor of 2/3 in both directions to a coordinate position (2/3,2/3) that is defined with respect to the dimensions of weight grid. The four weights of the weight grid that are closest to (e.g. surround, or are the nearest neighbours to) the position of the texel with respect to the weight grid are selected. The four weights closest to texel 202 can be determined using the coordinate position (2/3,2/3) of texel 202 that is defined with respect to the dimensions of weight grid. For example, the four closest weights to the coordinate position (2/3,2/3) are those with coordinates (0,0), (0,1), (1,0) and (1,1). In FIG. 2, the four weights closest to texel 202 are weights 204A, 204B, 204C and 204D. These weights, shown in cross-hatching, can be extracted (e.g. decoded, and read out for subsequent use) from the weight grid. A bilinear interpolation between these four weights can be used to calculate the interpolant weight 206 (shown in solid black) for texel 202. The contribution of each extracted weight to the interpolant weight 206 will be dependent on the coordinate positions (0,0), (0,1), (1,0) and (1,1) of the extracted weights and the coordinate position (2/3,2/3) for texel 202 that is defined with respect to the dimensions of weight grid.

Texture data compressed in accordance with the ASTC format can be decoded (e.g. decompressed) by an ASTC decoder. It is generally desirable to reduce the power consumption of devices such as ASTC decoders.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to a first aspect of the present invention there is provided a decoder configured to decode a plurality of texels of a p by q sub-block of texels from a block of texture data encoded according to the Adaptive Scalable Texture Compression (ASTC) format, the block of texture data representing an n by m block of texels, where p≤n and q≤m, the decoder being configured to: determine a position of a first texel of the p by q sub-block of texels with respect to the rows and/or columns of a weight grid, the weight grid comprising a first plurality of weights in a first plane; determine a position of a second texel of the p by q sub-block of texels with respect to the rows and/or columns of the weight grid; compare the positions of the first and second texels with respect to the rows and/or columns of the weight grid; extract fewer than (p+1)(q+1) weights of the first plurality of weights in response to determining that the positions of the first and second texels with respect to the rows and/or columns of the weight grid are between: the upper-most and lower-most rows of a predetermined number of adjacent rows of the weight grid; and/or the left-most and right-most columns of a predetermined number of adjacent columns of the weight grid; and decode the plurality of texels in dependence on the extracted weights.

The first and second texels may be in different rows of the p by q sub-block of texels, and the decoder may be configured to: determine a position of each of the first and second texels with respect to the rows of the weight grid; and compare the positions the first and second texels with respect to the rows of the weight grid.

The decoder may be configured to, in response to determining that the positions of the first and second texels with respect to the rows of the weight grid are between the upper-most and lower-most rows of a predetermined number of adjacent rows of the weight grid: operate on fewer than (p+1) rows of weights from the weight grid; and extract the fewer than (p+1)(q+1) weights of the first plurality of weights from said fewer than (p+1) rows of weights.

The first and second texels may be in the same column or different columns of the p by q sub-block of texels; the first and second texels may be the upper-most and lower-most texels in their respective column of the p by q sub-block of texels; and the predetermined number of rows of the weight grid may be p rows of the weight grid.

The decoder may be configured to independently operate on at least two rows of the said fewer than (p+1) rows of weights from the weight grid, either: in parallel using independent decoding hardware; or in series using the same decoding hardware.

The decoder may be configured to: determine a position of a third texel of the p by q sub-block of texels with respect to the columns of the weight grid, wherein the first and third texels are in different columns of the p by q sub-block of texels; compare the positions the first and third texels with respect to the columns of the weight grid; and in response to determining that the positions of the first and third texels with respect to the columns of the weight grid are between the left-most and right-most columns of a predetermined number of adjacent columns of the weight grid, extract fewer than (q+1) weights of the first plurality of weights from each of said fewer than (p+1) rows of weights.

The first and third texels may be in the same row or different rows of the p by q sub-block of texels; the first and third texels may be the left-most and right-most texels in their respective row of the p by q sub-block of texels; and the predetermined number of columns of the weight grid may be q columns of the weight grid.

The first and second texels may be in different columns of the p by q sub-block of texels, and the decoder may be configured to: determine a position of each of the first and second texels with respect to the columns of the weight grid; and compare the positions of the first and second texels with respect to the columns of the weight grid.

The decoder may be configured to, in response to determining that the positions of the first and second texels with respect to the columns of the weight grid are between the left-most and right-most columns of a predetermined number of adjacent columns of the weight grid: operate on a plurality of rows of weights from the weight grid; and extract fewer than (q+1) weights of the first plurality of weights from each of said plurality of rows of weights.

The first and second texels may be in the same row or different rows of the p by q sub-block of texels; the first and second texels may be the left-most and right-most texels in their respective row of the p by q sub-block of texels; and the predetermined number of columns of the weight grid may be q columns of the weight grid.

In an example, p=2 and q=2.

Determining a position of a texel with respect to the rows and/or columns of the weight grid may comprise scaling, using a scaling factor, a coordinate position of that texel that is defined according to the dimensions of the block of texels to a coordinate position for that texel that is defined with respect to the dimensions of weight grid.

Comparing the positions of the first and second texels with respect to the rows and/or columns of the weight grid may comprise comparing the column (x) and/or row (y) coordinate of the first texel defined with respect to the weight grid to the respective column (x) and/or row (y) coordinate of the second texel defined with respect to the weight grid.

The first and second texels may be in different rows of the p by q sub-block of texels and the decoder may be configured to compare the row (y) coordinate of the first texel defined with respect to the weight grid to the row (y) coordinate of the second texel defined with respect to the weight grid.

The row (y) coordinate of a texel defined with respect to the weight grid may be expressed in a fixed point number format having an integer part and a fractional part, and the decoder may be configured to compare the integer part of the row (y) coordinate of the first texel defined with respect to the weight grid to the integer part of the row (y) coordinate of the second texel defined with respect to the weight grid.

In an example p=2, the row (y) coordinate of a texel defined with respect to the weight grid may be expressed in a fixed point number format having an integer part and a fractional part, and the decoder may be configured to determine that the positions of the first and second texels with respect to the rows of the weight grid are between the upper-most and lower-most rows of 2 adjacent rows of the weight grid by determining whether the least significant bit of the integer part of the row (y) coordinate of the first texel defined with respect to the weight grid matches the least significant bit of the integer part of the row (y) coordinate of the second texel defined with respect to the weight grid.

The first and second texel may be in different columns of the p by q sub-block of texels and the decoder may be configured to compare the column (x) coordinate of the first texel defined with respect to the weight grid to the column (x) coordinate of the second texel defined with respect to the weight grid.

The column (x) coordinate of a texel defined with respect to the weight grid may be expressed in a fixed point number format having an integer part and a fractional part, and the decoder may be configured to compare the integer part of the column (x) coordinate of the first texel defined with respect to the weight grid to the integer part of the column (x) coordinate of the second texel defined with respect to the weight grid.

In an example q=2, the column (x) coordinate of a texel defined with respect to the weight grid may be expressed in a fixed point number format having an integer part and a fractional part, and the decoder may be configured to determine that the positions of the first and second texels with respect to the columns of the weight grid are between the left-most and right-most columns of 2 adjacent columns of the weight grid by determining whether the least significant bit of the integer part of the column (x) coordinate of the first texel defined with respect to the weight grid matches the least significant bit of the integer part of the column (x) coordinate of the second texel defined with respect to the weight grid.

The decoder may comprise an XOR gate configured to perform said bit comparison.

Decoding the plurality of texels in dependence on the extracted weights may comprise, for each texel of the plurality of texels: interpolating between a plurality of the extracted weights to determine an interpolate weight for that texel; and determining a colour value for that texel by interpolating between a respective pair of colour endpoints using the interpolate weight for that texel.

The block of texture data may be encoded using single-plane mode or dual-plane mode.

The weight grid may comprise a second plurality of weights in a second plane, and the decoder may be configured to: extract fewer than (p+1)(q+1) weights of the second plurality of weights in response to determining that the positions of the first and second texels with respect to the rows and/or columns of the weight grid are between: the upper-most and lower-most rows of a predetermined number of adjacent rows; and/or the left-most and right-most columns of a predetermined number of adjacent columns of the weight grid.

According to a second aspect of the present application there is provided a method of decoding a plurality of texels of a p by q sub-block of texels from a block of texture data encoded according to the Adaptive Scalable Texture Compression (ASTC) format, the block of texture data representing an n by m block of texels, where $p \leq n$ and $q \leq m$, the method comprising: determining a position of a first texel of the p by q sub-block of texels with respect to the rows and/or columns of a weight grid, the weight grid comprising a first plurality of weights in a first plane; determining a position of a second texel of the p by q sub-block of texels with respect to the rows and/or columns of the weight grid; comparing the positions of the first and second texels with respect to the rows and/or columns of the weight grid; extracting fewer than (p+1)(q+1) weights of the first plurality of weights in response to determining that the positions of the first and second texels with respect to the rows and/or columns of the weight grid are between: the upper-most and lower-most rows of a predetermined number of adjacent rows of the weight grid; and/or the left-most and right-most columns of a predetermined number of adjacent columns of the weight grid; and decoding the plurality of texels in dependence on the extracted weights.

The decoder described herein may be embodied in hardware on an integrated circuit. There may be provided a method of manufacturing, at an integrated circuit manufacturing system, the decoder described herein. There may be provided an integrated circuit definition dataset that, when processed in an integrated circuit manufacturing system, configures the system to manufacture the decoder described herein. There may be provided a non-transitory computer readable storage medium having stored thereon a computer readable description of the decoder described herein that, when processed in an integrated circuit manufacturing system, causes the integrated circuit manufacturing system to manufacture an integrated circuit embodying the decoder described herein.

There may be provided an integrated circuit manufacturing system comprising: a non-transitory computer readable storage medium having stored thereon a computer readable description of the decoder described herein; a layout processing system configured to process the computer readable description so as to generate a circuit layout description of an integrated circuit embodying the decoder described herein; and an integrated circuit generation system configured to manufacture the decoder described herein according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 1A shows a colour endpoint pair located within an RB colour space.

FIG. 1B shows a 4 by 4 block of texels and a grid of weights indicating the weight for each texel used to interpolate between a colour endpoint pair.

FIG. 2 illustrates the determination of an interpolant weight for a texel using a subset of weights selected from a weight grid.

Figure 3A:
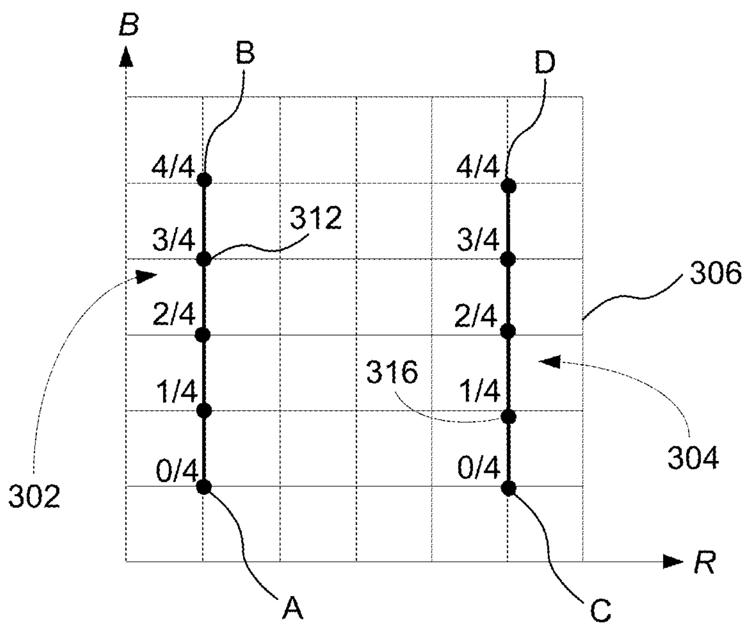
FIG. 3A shows two colour endpoint pairs located within an RB colour space.
Figure 3B:
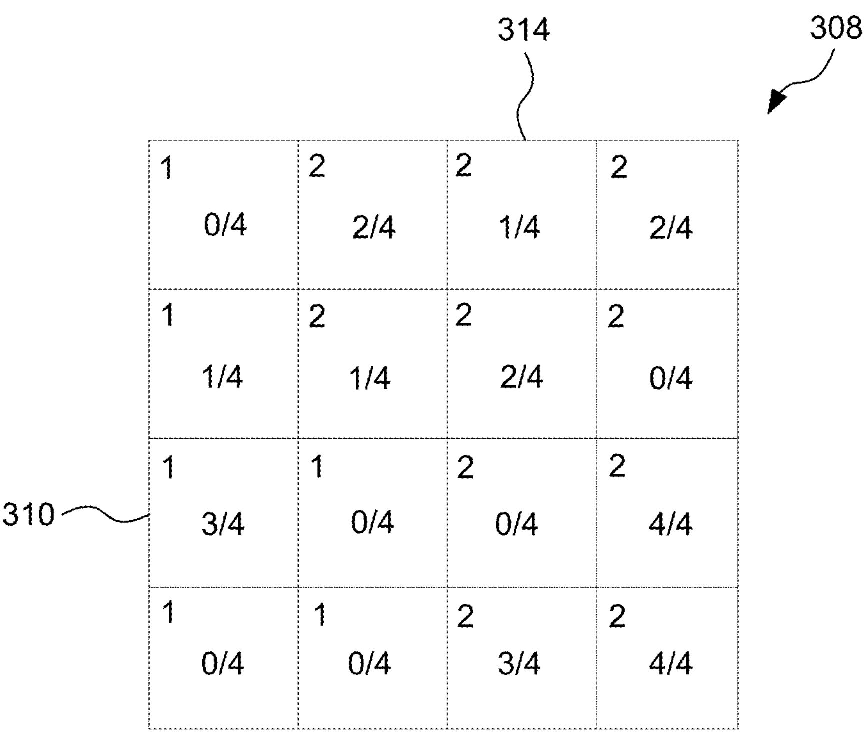
FIG. 3B shows a 4 by 4 block of texels with a partition mask indicating the partition index of each texel and a weight grid indicating the weight for each texel.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Texture data compressed in accordance with the Adaptive Scalable Texture Compression (ASTC) format can be decoded (e.g. decompressed) by an ASTC decoder. Typically, these decoders decode a single texel from a received block of texture data, where that data block represents at least a 4 by 4 block of texels.

Figure 5:
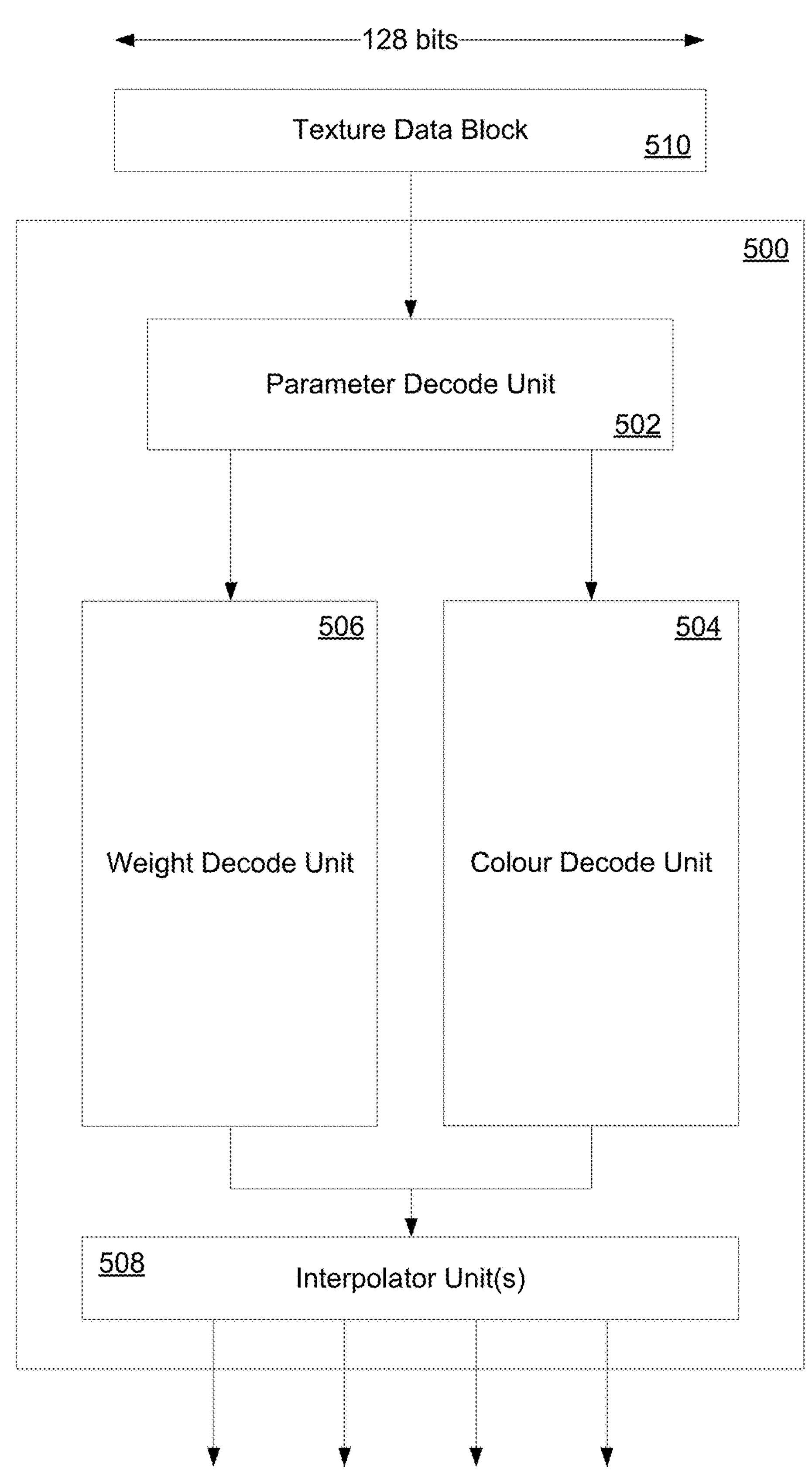
FIG. 5 shows a decoder for decoding a plurality of texels from a block of texture data compressed according to the ASTC format.

By contrast, described herein is a decoder that is capable of decoding multiple texels from a block of texture data compressed according to the ASTC format. FIG. 5 shows a decoder 500 for decoding a plurality of texels from a block of texture data compressed according to the ASTC format. The decoder 500 can be implemented in fixed function hardware, software running on general purpose hardware, or any combination thereof.

The decoder 500 is configured to receive as an input a block of ASTC-encoded texture data, shown at 510. The block of texture data 510 can store configuration data, colour data and weight data. The configuration data can indicate parameters of the texture data and its encoding within the block of texture data, and is generally used to facilitate the decoding of colour and weight data. The colour data relates to colour values that are to be converted into colour endpoints. The weight data relates to the weights used to interpolate between colour endpoints.

The colour data and/or weight data may be encoded according to an integer sequence encoding (ISE) scheme—as defined in the ASTC specification. The integer sequence encoding (ISE) scheme is sometimes referred to as a bounded integer sequence encoding (BISE) scheme. The use of the ISE scheme enables the colour and/or weight values to be encoded in a fractional number of bits. A sequence of values can be represented using trits (base-3 representation) or quints (base-5 representation). Other base representations may also be used.

The weight data may represent a grid (e.g. a 2D grid) of weights. The weight data representing the weight grid may be stored in the block of texture data 510 in a one-dimensional bit vector. The weights of the weight grid may be encoded in a row-by-row pattern. That is, the one-dimensional bit vector may encode the weights of the first row of the weight grid, followed by the second row of the weight grid, etc.

It is also possible for the block of texture data 510 to utilise a so-called "dual-plane mode". The dual-plane mode is defined in the ASTC specification. In brief, for "single-plane" texture data, the weight grid encoded in the data block comprises a first plurality of weights in a first plane. For dual-plane texture data, the weight grid encoded in the data block comprises a first plurality of weights in a first plane and a second plurality of weights in a second plane—where the dimensions of the first and second plane are the same. In dual-plane mode, the two different planes of weights can be assigned to (e.g. are for use to interpolate between colour components in) different colour channels (e.g. R, G and B, and A colour channels, respectively, in RGBA colour space). Whether or not dual-plane mode is used can be indicated within the configuration data.

The block of texture data 510 may be encoded using either high dynamic range (HDR) or low dynamic range (LDR) (corresponding to the HDR profile and LDR profile respectively). Generally, the LDR profile supports two-dimensional textures, but it is also possible to support three-dimensional textures. The HDR profile also supports two-dimensional textures and additionally supports three-dimensional textures composed of multiple two-dimensional slices of compressed data.

The block of texture data 510 represent (e.g. encodes) texel colours for an n by m block of texels. It is to be understood that the texel colours may be formed from colour channels (e.g. luminance, R, G, B, alpha etc.), but in general may represent many different types of graphics data, e.g. height maps, normal maps, lighting etc.

The n by m block of texels represented by the block of texture data 510 may form part of a compressed image, or texture. The block of texture data 510 has a fixed size (e.g. memory footprint) of 128 bits. A texture may be composed of a plurality of such blocks of texture data, with each of those data blocks being encoded in a respective 128-bit data block.

The size of the n by m block of texels (as governed by the values of n and m) may be referred to as the block's footprint. In other words, the block of texture data 510 may have a block footprint of n by m. The block footprint is selectable from a number of predefined sizes specified by the ASTC specification. For 2-D textures, examples of block footprints include 4×4 texels; 6×6 texels; 8×8 texels and 12×12 texels.

The decoder 500 is configured to decode a plurality of texels of a p by q sub-block of texels from the n by m block of texels represented by the block of texture data, where p≤n and q≤m. The number of texels ne comprised by the p by q sub-block of texels may be in the range $2 \leq n_t \leq nm$. The plurality of texels that are decoded from the p by q sub-block of texels may comprise pq texels. That is, the plurality of texels that are decoded may be all of the texels of the p by q sub-block of texels.

In other words, the maximum number of texels capable of being decoded from a single received block of texture data 510 may be denoted pq.

Figure 4:
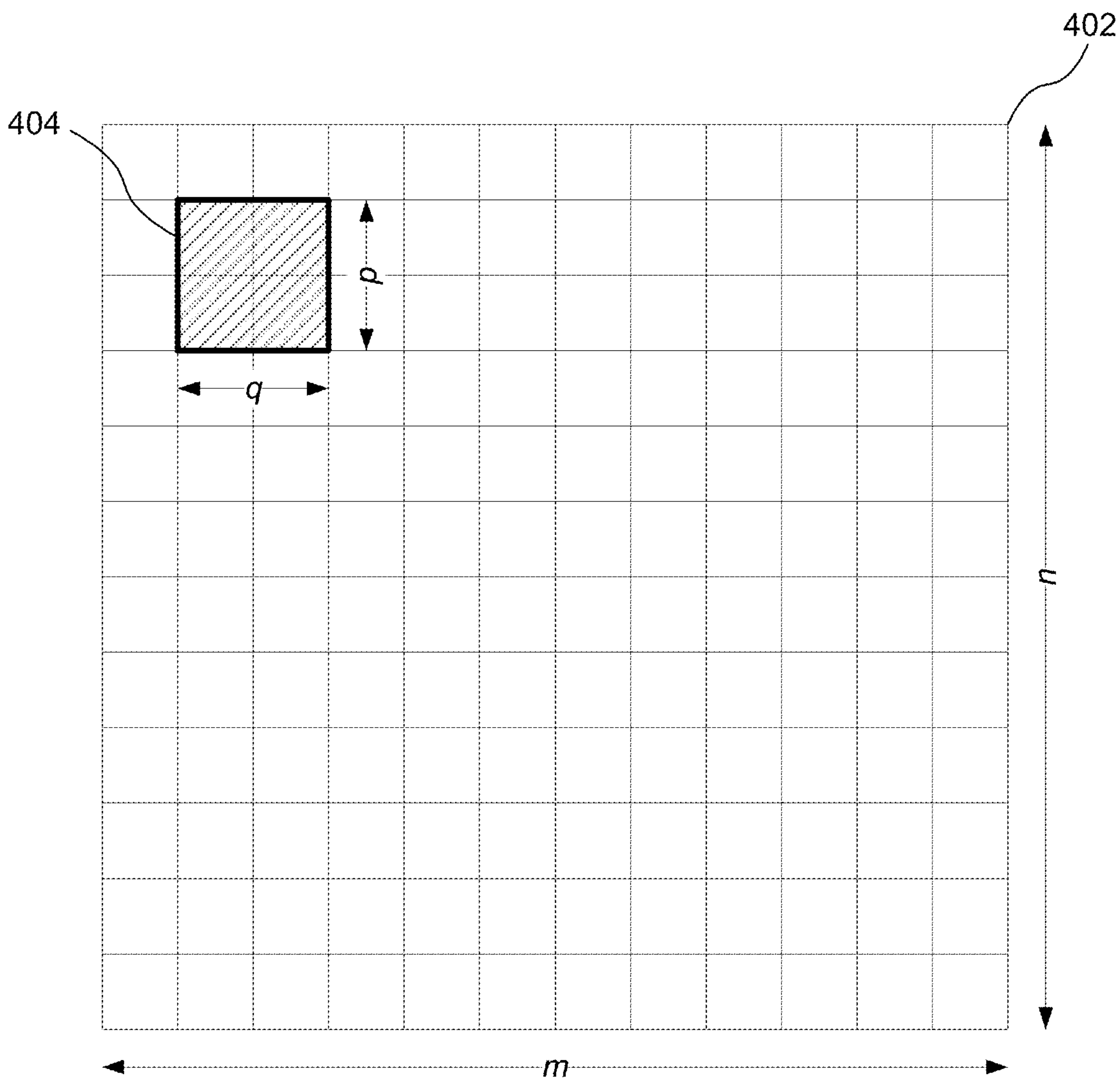
FIG. 4 shows an example of a n by m block of texels and an example p by q sub-block of texels from that block of texels.

FIG. 4 shows an example of a n by m block of texels and an example p by q sub-block of texels from that block of texels. In FIG. 4, the block of texels 402 is a 12 by 12 block of texels, and the plurality of texels to be decoded from that block of texels are arranged as a 2 by 2 sub-block of texels 404. Though just an example, decoding a 2 by 2 sub-block of texels from a block of texture data may be particularly useful due to the use of 2 by 2 texel blocks in a variety of filtering operations including, for example, bi-linear filtering, tri-linear filtering and anisotropic filtering. That said, it is to be understood that the decoder described herein could be configured to decode any suitable number of texels from a block of texture data. For example, the ASTC decoder described herein could decode a plurality of texels of a p by q sub-block of texels from the data block, where each of the p and q dimensions of the sub-block are any number less than or equal to the corresponding n and m dimensions of the block footprint.

The decoder 500 may decode the plurality of texels of the p by q sub-block of texels in parallel. The decoder may, for instance, comprise a plurality of outputs for outputting respective decoded texels. The decoder may operate to decode the plurality of texels according to a decoding process. That decoding process may comprise a series of decoding steps, or operations. The series of steps undergone to decode a particular texel may be referred to as a decoding pipeline. Thus, the decoder 500 may operate to decode a plurality of texels from the block of texture data 510, where each texel is decoded according to decoding pipeline.

The decoder 500 described herein can operate to decode a plurality of texels of a p by q sub-block of texels in parallel. However, advantageously, the decoder 500 can use certain portions of the data decoded from the block of texture data 510 as part of the decoding process for each of the plurality of texels of the p by q sub-block of texels being decoded from that block. Thus, a plurality of texels of the p by q sub-block of texels can be decoded from the block of texture data 510 in parallel without requiring parallel processing for all stages of the decoding process. This means the decoder 500 can have reduced hardware requirements (e.g. have a reduced area if implemented on an integrated circuit) compared to operating multiple conventional ASTC single-texel-decoders in parallel.

As described herein, the plurality of texels of the p by q sub-block of texels that are decoded in parallel by decoder 500 may comprise pq texels. That is, the plurality of texels that are decoded from a single received block of texture data may be all of the texels of the p by q sub-block of texels. That said, it is to be understood that, in some instances, decoder 500 may decode fewer than pq texels of the p by q sub-block of texels from the received data block. The number of texels that the decoder actually decodes from the p by q sub-block of texels may depend on the texel request received by the decoder 500. If the decoder, in response to receiving a block of texture block 510 and a texel request, determines that fewer than pq texels are to be decoded from the p by q sub-block of texels in parallel, then it may turn down (e.g., power down, or turn off) a portion of its hardware to reduce power consumption. The size of the portion being turned down may be determined so that the remaining portion of the hardware (i.e. the portion that has not been turned down) can decode the requested texel(s) without incurring a performance penalty (e.g. in the time taken to decode the requested texel(s)).

The decoder 500 comprises a parameter decode unit 502, a colour decode unit 504, a weight decode unit 506 and at least one interpolator unit 508. The parameter decode unit 502 is coupled to the colour decode unit 504 and the weight decode unit 506. More specifically, an output of the parameter decode unit 502 is coupled to an input of both the weight decode unit 506 and colour decode unit 504. Each of the colour decode unit 504 and the weight decode unit 506 are coupled to the at least one interpolator unit 508. More specifically, an output of each of the weight decode unit 506 and colour decode unit 504 is coupled to an input of the interpolator unit(s) 508.

The basic functions of each of the parameter decode unit 502, the weight decode unit 506, the colour decode unit 504 and the interpolator unit(s) 508 of decoder 500 are summarised in the following four paragraphs.

The parameter decode unit 502 receives the block of texture data 510. The parameter decode unit operates to decode configuration data for the block of texture data 510. The configuration data may be data that specifies parameters of the texture data and its encoding within the block of texture data 510. The configuration data could include, for example: the weight grid dimensions and/or the range of the weight values; an indication of whether the texture data is single-plane or dual-plane; the partition count (e.g., the number of partitions for the block of texture data 510) and the colour endpoint mode(s). The ASTC specification defines said various types of configuration data. The parameter decode unit 502 may also determine, e.g. using the weight grid dimensions, the position of each texel being decoded with respect to the weight grid.

The weight decode unit 506 decodes interpolation weight data for each of the plurality of texels of the p by q sub-block of texels being decoded from the block 510. The interpolation weight data for a given texel could be a single interpolant weight (e.g. if the texture data in the block uses single-plane mode) or a pair of interpolant weights (e.g. if the texture data in the block uses dual-plane mode). In certain encodings, the number of weights in each plane of the weight grid may correspond to the number of texels in the data block. In these encodings, the weight decode unit 506 may extract (e.g. decode, and read out for subsequent use) interpolant weight(s) for each texel being decoded directly from the weight grid. Alternatively, a sparser weight grid may be stored that comprises fewer weights in each plane than the number of texels represented by each data block. In this alternative, the weight decode unit 506 may determine interpolant weight(s) for each texel of the p by q sub-block of texels being decoded by interpolating between selected weights of this sparser weight grid—e.g. in dependence on the position of each texel being decoded with respect to the weight grid, as determined by the parameter decode unit 502. This alternative is described below in further detail. In this way, the weight decode unit may decode an interpolant weight for each texel being decoded from the block 510 (in single-plane mode), or a pair of interpolant weights for each texel being decoded from the block 510 (in dual-plane mode).

The colour decode unit 504 decodes colour endpoint data for the plurality of texels of the p by q sub-block of texels being decoded from the block of texture data 510. The colour endpoint data includes a pair of colour endpoints for each of one or more partitions. When decoding a texel, colour values are decoded from the colour data encoded in data block, and those colour values are then converted into colour endpoints. The way that colour values encoded in the block of texture data 510 are converted into colour endpoints by the colour decode unit 504 is defined by an algorithm known as the colour endpoint mode. Information on the colour endpoint mode(s) to be used is part of the configuration data decoded by the parameter decode unit 502. The ASTC specification defines 16 possible colour endpoint modes, which vary from computing a pair of colour endpoints from two colour values up to computing a pair of colour endpoints from eight colour values. Each texel in the data block can be assigned to one of up to four partitions, where each partition is associated with its own colour endpoint pair. If the block of data has a partition count of one, then each of the texels being decoded is associated with the same colour endpoint pair. That said, the colour endpoint data may include up to eight colour endpoints forming four colour endpoint pairs (for a partition count of four—i.e. one colour endpoint pair per partition).

The interpolation unit(s) 508 calculate an output colour value for each of the plurality of texels of the p by q sub-block of texels being decoded. The interpolator unit(s) 508 may calculate the colour for each texel being decoded by using the interpolant weight(s) for that texel (as output by the weight decode unit 506) to interpolate between the colour endpoint pair to which that texel is assigned (as output by the colour decode unit 504). More specifically, to determine the colour for a texel, a partition index associated with the texel can be used to identify the colour endpoint pair of the partition to which that texel is assigned. The interpolant weight(s) for that texel can then be used to interpolate between that pair of colour end points. Some examples of using a single interpolant weight for a texel to interpolate between a colour endpoint pair are described herein with reference to FIGS. 1A, 1B, 3A and 3B. In dual-plane mode, a first interpolant weight for a texel can be used to interpolate between endpoints in a first colour channel (e.g. A channel in RGBA colour space) of a colour endpoint pair, whilst a second interpolant weight for that texel can be used to interpolate between endpoints in the other colour channels (e.g. RGB channels in RGBA colour space) of that colour endpoint pair. This is explained in further detail in the ASTC specification.

The decoder 500 may then output the decoded colour values for each of the plurality of texels of the p by q sub-block of texels being decoded. The plurality of texel colour values may be outputted in parallel.

The present disclosure relates to improvements in the extraction of weights from a weight grid that are to be used to calculate the interpolant weight(s) for each texel of a plurality of texels of a p by q sub-block of texels. These improvements relate, primarily, to the functions of the weight decode unit of such a decoder (e.g. weight decode unit 506 of decoder 500 shown in FIG. 5)—as will be described further herein.

For ease of description, the following examples are described with reference to block of texture data 510 that does not use dual-plane mode. That is, in these examples, the weight grid comprises a first plurality of weights in a first plane. In these examples, the weight grid does not comprise a second plurality of weights in a second plane. That said, the skilled person would have no difficulty applying the principles described herein to the decoding of a block of encoded texture data that does use dual-plane mode.

In the following examples, the block of texture data 510 encodes a weight grid that comprises fewer weights (e.g. in its single plane, in single-plane mode) than the number of texels represented by the block of texture data 510. In other words, the weight grid comprises fewer weights per-plane than the number of texels comprised by the n by m block of texels. That is, the dimensions of the weight grid differ from the dimensions of the block footprint. In these examples, the decoder 500 determines an interpolant weight for each texel of the p by q sub-block of texels being decoded by interpolating between selected weights of this sparser weight grid.

As described herein, in examples where the weight grid is sparser than the block footprint, four weights from the weight grid can be interpolated between to determine an interpolant weight for a texel. The decoder 500 described herein is configured to decode an interpolant weight for each of a plurality of texels of a p by q sub-block of texels. That said, the decoder need not extract 4pq weights from each plane of the weight grid for use in determining the interpolant weights for each of the plurality of texels to be decoded. This is because, as the weight grid is sparser than the n by m block of texels comprising the p by q sub-block of texels, after determining the position of each texel of the p by q sub-block of texels with respect to the weight grid: the p texels in a column of texels in the p by q sub-block of texels will always be positioned between the upper-most and lower-most rows of no more than (p+1) adjacent rows of weights in the weight grid; and the q texels in a row of texels in the p by q sub-block of texels will always be positioned between the left-most and right-most columns of no more than (q+1) adjacent columns of weights in the weight grid. As such, one way of decoding a plurality of texels of a p by q sub-block of texels is to always extract (e.g. decode, and read out for subsequent use) (p+1)(q+1) weights from each plane of the weight grid for use in determining the interpolant weights for each of the plurality of texels to be decoded. This approach can be understood with reference to FIG. 6.

Figure 6:
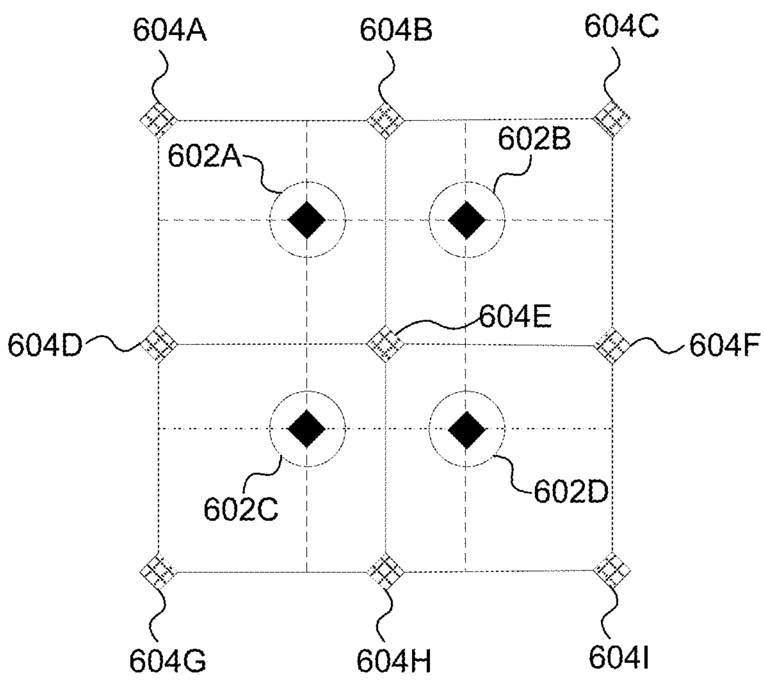
FIG. 6 illustrates an example in which (p+1)(q+1) weights are extracted from a weight grid for use in determining the interpolant weights for a plurality of texels of a p by q sub-block of texels.

FIG. 6 illustrates an example in which (p+1)(q+1) weights are extracted (e.g. decoded, and read out for subsequent use) from a weight grid for use in determining the interpolant weights for a plurality of texels of a p by q sub-block of texels. FIG. 6 shows the positions of a plurality of texels (shown as circles) of a 2 by 2 sub-block of texels with respect to 9 weights (shown as diamonds) of a weight grid. For ease of illustration, the other texels of the n by m block of texels comprising the p by q sub-block of texels are not shown. It is also to be understood that the weight grid may comprise further weights than the 9 weights shown in FIG. 6.

In FIG. 6, the p by q sub-block of texels comprises texels 602A-D. The weight grid comprises weights 604A-I. The 2 texels in each column of texels (e.g. texels 602A and 602C, and texels 602B and 602D, respectively) are positioned, with respect to the weight grid, between the upper-most and lower-most rows of 3 adjacent rows of weights (e.g. between the upper-most row comprising weights 604A-C and the lower-most row comprising weights 604G-1) in the weight grid. Also, the 2 texels in each row of texels (e.g. texels 602A-B, and texels 602C-D, respectively) are positioned, with respect to the weight grid, between the left-most and right-most columns of 3 adjacent columns of weights in the weight grid (e.g. between the left-most column comprising weights 604A,D,G and the right-most column comprising weights 604C,F,I). Weights 604A,B,D,E are the closest to (e.g. surround, or are the nearest neighbours to) texel 602A; weights 604B,C,E,F are the closest to texel 602B; weights 604D,E,G,H are the closest to texel 602C; and weights 604E,F,H,I are the closest to texel 602D. Thus, the interpolant weights for each of four texels 602A-D can be determined using the nine (where p=q=2, (p+1)(q+1)=9) weights 604A-I. These selected weights, shown in cross-hatching, can be extracted from the weight grid. A bilinear interpolation between the four weights closest to each texel (as identified above) can be used to calculate the interpolant weights (shown in solid black, but not labelled for each of illustration) for each of those texels.

The row and column positions of the weights to be extracted from the weight grid can be determined in dependence on the positions of one or more of the plurality of texels of the p by q sub-block of texels with respect to the weight grid. For example, if the upper-left-most texel in the p by q sub-block of texels has a coordinate position (x,y) with respect to the weight grid, then it can be determined that the (p+1)(q+1) weights to be decoded are those with coordinate positions from (floor(x), floor(y)) to (floor(x)+q, floor(y)+p).

As described herein, the block of texture data 510 stores the weight data representing the weight grid in a one-dimensional bit vector, with the weights of the weight grid being encoded in a row-by-row pattern. For this reason, in order to extract said (p+1)(q+1) weights from the weight grid, it is most efficient for the decoder 500 (e.g. the weight decode unit 506 of decoder 500) to independently operate on each of the (p+1) rows of weights from which weights are to be extracted. For example, the decoder may operate on each of said (p+1) rows in parallel using independent decoding hardware, or operate on each of said (p+1) rows in series using the same decoding hardware. Each instance of decoding hardware may be configured to: (i) determine how far it needs to shift the one-dimensional bit vector encoding the weight data in order to access the encoded row of weights it is to operate on; (ii) shift the one-dimensional bit vector by the determined amount; and (iii) extract the selected weights from that encoded row of weights. For example, in step (iii) the entire encoded row of weights being operated on may be decoded (e.g. by decoding one or more blocks of ISE encoded weight data), with only the selected weights being read out from the decoded weight data for subsequent use. It is to be understood that an encoded row of weights may not necessarily fit neatly into a single ISE block. For example, if a weight grid is four weights wide and trits are used to encode the weights, then the first ISE block will encode five weights, four weights from the first row of the weight grid and one weight from the second row of the weight grid. The other weights of the second row of the weight grid will be encoded in the second ISE block, along with the first two weights of the third row of the weight grid, etc. Hence, more than one ISE blocks may need to be decoded to access all of the weights of an encoded row of weights.

The present disclosure relates to reducing the amount of power required to extract weights from the weight grid that are to be used to calculate the interpolant weight(s) for each texel of a plurality of texels of a p by q sub-block of texels. In other words, the principles described herein relate to reducing power consumption of a decoder configured to decode a plurality of texels of a p by q sub-block of texels from an n by m block of texture data encoded according to the ASTC format. It is generally desirable to reduce the power consumption of devices, such as ASTC decoders, which may be implemented in mobile (e.g. battery powered) devices—e.g. to extend the battery life of said mobile devices.

The inventor has realised that, in certain cases, after determining the position of each texel of a p by q sub-block of texels to be decoded with respect to the weight grid: the p texels in a column of texels in the p by q sub-block of texels may be positioned between the upper-most and lower-most rows of fewer than (p+1) adjacent rows of weights in the weight grid; and/or the q texels in a row of texels in the p by q sub-block of texels may be positioned between the left-most and right-most columns of fewer than (q+1) adjacent columns of weights in the weight grid. This can occur, for example, when the weight grid is significantly sparser than the block footprint. In these cases, the power consumption of a decoder configured to decode a plurality of texels of a p by q sub-block of texels from an n by m block of texture data encoded according to the ASTC format can be advantageously reduced by extracting (e.g. decoding, and reading out for subsequent use) fewer than (p+1)(q+1) weights from the weight grid. This is explained further in the following.

Figure 8:
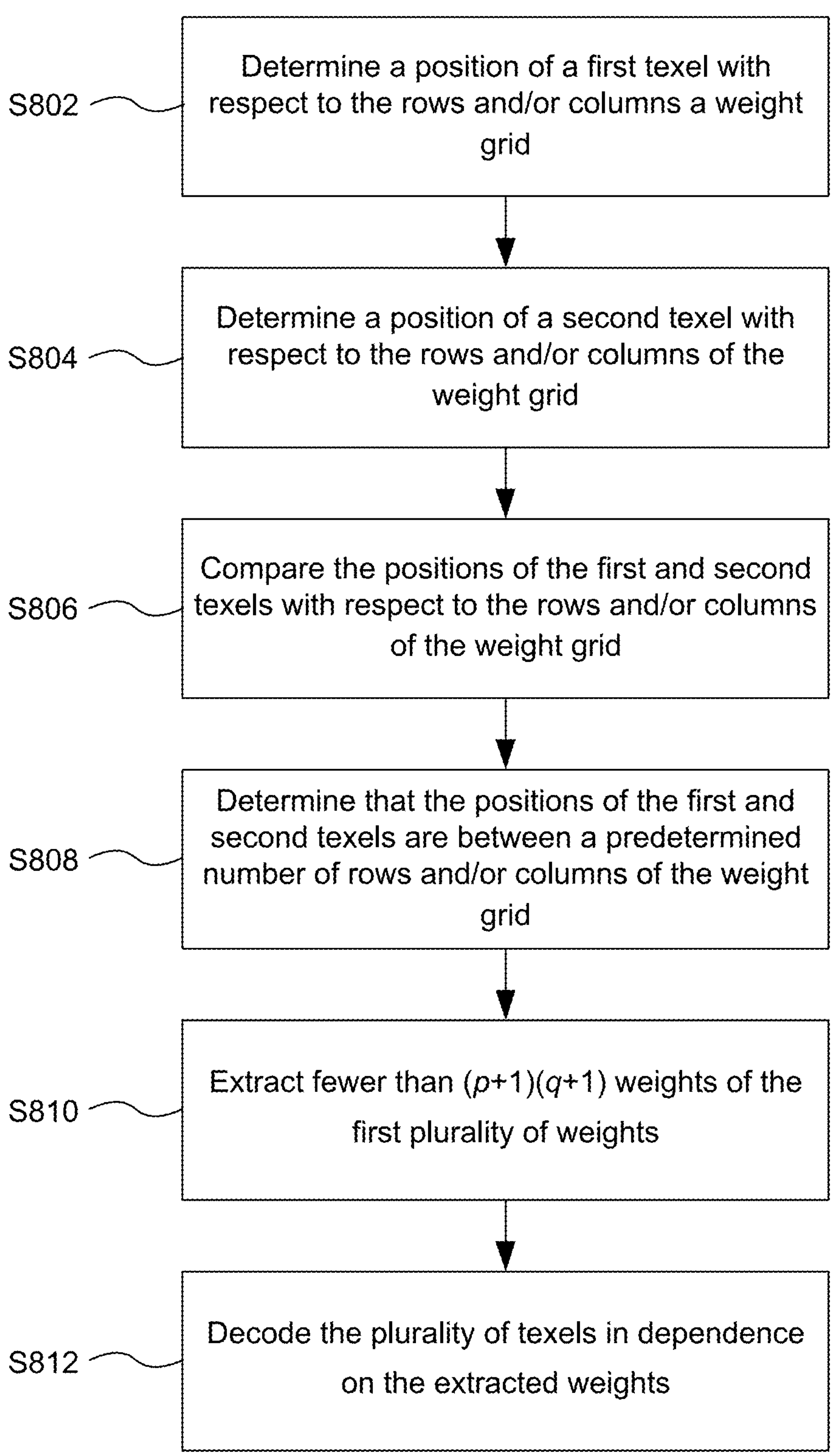
FIG. 8 shows a method according to the principles described herein of decoding a plurality of texels from a block of texture data encoded according to the ASTC format.

FIG. 8 shows a method according to the principles described herein of decoding a plurality of texels from a block of texture data encoded according to the ASTC format. The method of FIG. 8 may be a computer-implemented method and/or implemented in fixed function hardware.

The decoder 500 described herein with reference to FIG. 5 can be configured to perform the method of FIG. 8.

Figure 7A:
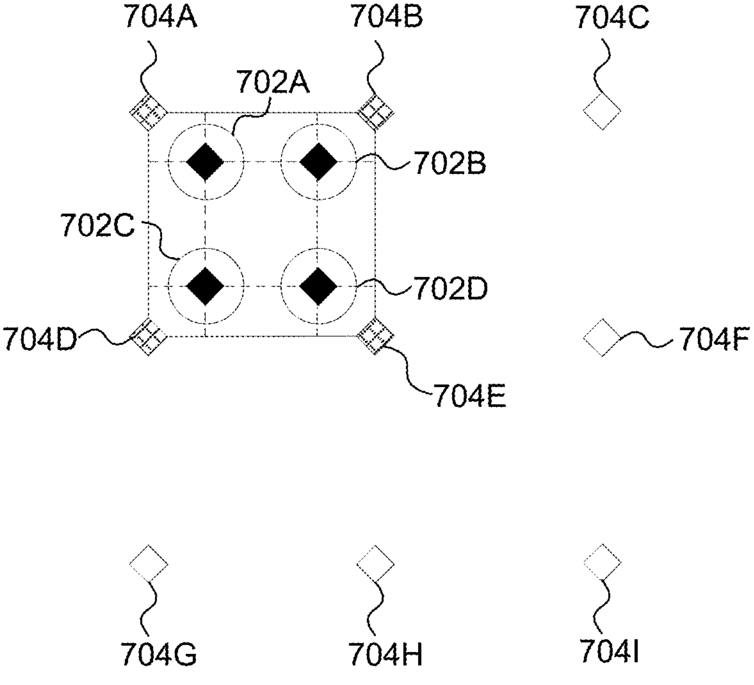
FIGS. 7A to 7C illustrate three examples in which fewer than (p+1)(q+1) weights can be extracted from a weight grid for use in determining the interpolant weights for a plurality of texels of a p by q sub-block of texels.
Figure 7B:
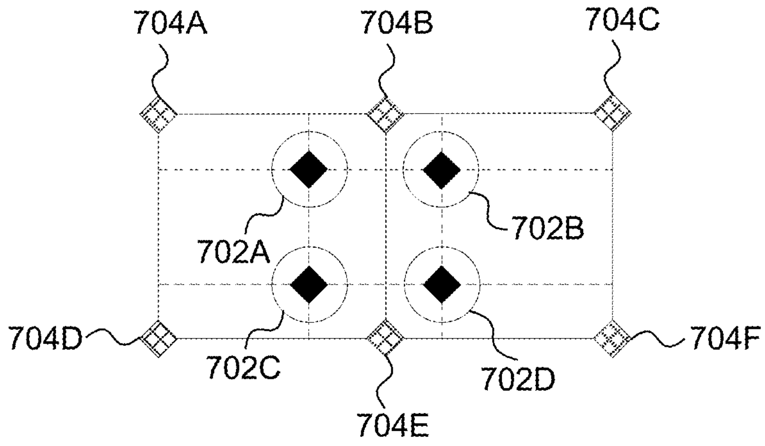
Figure 7B:
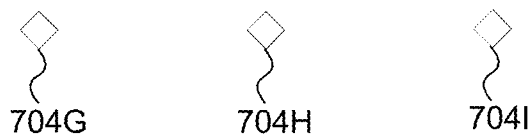
Figure 7C:
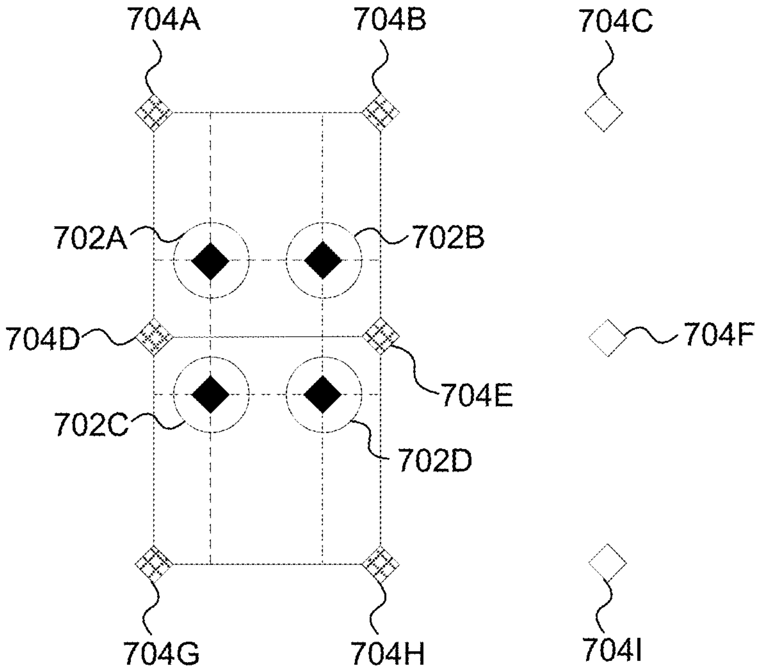

The method of FIG. 8 can be further understood with reference to FIGS. 7A to 7C, which illustrate three examples in which fewer than (p+1)(q+1) weights can be extracted (e.g. decoded, and read out for subsequent use) from each plane of a weight grid for use in determining the interpolant weights for a plurality of texels of a p by q sub-block of texels. FIGS. 7A to 7C shows the positions of a plurality of texels (shown as circles) of a 2 by 2 sub-block of texels with respect to 9 weights (shown as diamonds) of a weight grid. For ease of illustration, the other texels of the n by m block of texels comprising the p by q sub-block of texels are not shown. It is also to be understood that the weight grid may comprise further weights than the 9 weights shown in FIGS. 7A to 7C.

In step S802, the position of a first texel of the p by q sub-block of texels with respect to the rows and/or columns a weight grid is determined. In step S804, the position of a second texel of the p by q sub-block of texels with respect to the rows and/or columns a weight grid is determined. Steps S802 and S804 may be performed by the parameter decode unit 502 of decoder 500.

Determining the position of a texel with respect to the rows and/or columns of the weight grid may comprise scaling, using a scaling factor, a coordinate position (u,v) of that texel that is defined according to the dimensions of the block of texels (i.e. "the block footprint") to a coordinate position (x,y) for that texel that is defined with respect to the dimensions of weight grid. The scaling factor may be dependent on the relative dimensions of the weight grid and block of texels. An example of scaling a coordinate position (u,v) of a texel that is defined according to the dimensions of the blocks texels to a coordinate position (x,y) for that texel that is defined with respect to the dimensions of weight grid is described herein with reference to FIG. 2. The coordinate positions (u,v) and (x,y) may be expressed in a fixed point number format. A coordinate position (x,y) for a texel that is defined with respect to the dimensions of weight grid may have an integer part and a fractional part.

In an example, when the first and second texels are in different rows and different columns of the p by q sub-block of texels, steps S802 and S804 may comprise determining a position of each of the first and second texels with respect to the rows and columns of the weight grid. That is, steps S802 and S804 may comprise determining row (y) and column (x) coordinates for each of the first and second texels with respect to the weight grid. The first and second texels may be the left-most and right-most texels in their respective row of the p by q sub-block of texels. The first and second texels may be the upper-most and lower-most texels in their respective column of the p by q sub-block of texels. For example, referring to FIGS. 7A-C, the first and second texels may be texels 702A and 702D, respectively. In this example, the method need not comprise determining a position of any other texel of the p by q sub-block of texels with respect to the rows or columns of the weight grid.

In another example, when the first and second texels are in different rows of the p by q sub-block of texels, steps S802 and S804 may comprise determining a position of each of the first and second texels with respect to the rows of the weight grid. That is, steps S802 and S804 may comprise determining a row (y) coordinate for each of the first and second texels with respect to the weight grid. In this example, the first and second texels may be in the same column of the p by q sub-block of texels. The first and second texels may be the upper-most and lower-most texels in that column of the p by q sub-block of texels. For example, referring to FIGS. 7A-C, the first and second texels may be texels 702A and 702C, respectively. In this case, steps S802 and S804 need not comprise determining a position of each of the first and second texels with respect to the columns of the weight grid. Instead, the method may further comprise determining a position of a third texel with respect to the columns of the weight grid (e.g. a column (x) coordinate for said third texel with respect to the weight grid), where the first and third texels are in a different column of the p by q sub-block of texels. The first and third texels may be in the same row, or a different row, of the p by q sub-block of texels. The first and third texels may be the left-most and right-most texels in their respective row of the p by q sub-block of texels. For example, referring to FIGS. 7A-C, the third texel may be texel 702B.

In yet another example, when the first and second texels are in different columns of the p by q sub-block of texels, steps S802 and S804 may comprise determining a position of each of the first and second texels with respect to the columns of the weight grid. That is, steps S802 and S804 may comprise determining a column (x) coordinate for each of the first and second texels with respect to the weight grid. In this example, the first and second texels may be in the same row of the p by q sub-block of texels. The first and second texels may be the left-most and right-most texels in that row of the p by q sub-block of texels. For example, referring to FIGS. 7A-C, the first and second texels may be texels 702A and 702B, respectively. In this case, steps S802 and S804 need not comprise determining a position of each of the first and second texels with respect to the rows of the weight grid. Instead, the method may further comprise determining a position of a third texel with respect to the rows of the weight grid (e.g. a row (y) coordinate for said third texel with respect to the weight grid), where the first and third texels are in a different row of the p by q sub-block of texels. The first and third texels may be in the same column, or a different column, of the p by q sub-block of texels. The first and third texels may be the upper-most and lower-most texels in their respective column of the p by q sub-block of texels. For example, referring to FIGS. 7A-C, the third texel may be texel 702C.

In step S806, the positions of the first and second texels with respect to the rows and/or columns of the weight grid are compared. Step S806 may be performed by the weight decode unit 502 of decoder 500.

In an example, when the first and second texels are in different rows and different columns of the p by q sub-block of texels, step S806 may comprise comparing the positions of first and second texels with respect to the rows and columns of the weight grid. That is, step S806 may comprise comparing: the row (y) coordinate of the first texel with respect to the weight grid to the row (y) coordinate of the second texel with respect to the weight grid; and the column (x) coordinate of the first texel with respect to the weight grid to the column (x) coordinate of the second texel with respect to the weight grid. The first and second texels may be the left-most and right-most texels in their respective row of the p by q sub-block of texels. The first and second texels may be the upper-most and lower-most texels in their respective column of the p by q sub-block of texels. For example, referring to FIGS. 7A-C, the first and second texels may be texels 702A and 702D, respectively. In this example, the method need not comprise comparing the position of the first texel to that of any other texel of the p by q sub-block of texels with respect to the rows or columns of the weight grid.

In another example, when the first and second texels are in different rows of the p by q sub-block of texels, step S806 may comprise comparing the positions of first and second texels with respect to the rows of the weight grid. That is, step S806 may comprise comparing the row (y) coordinate of the first texel with respect to the weight grid to the row (y) coordinate of the second texel with respect to the weight grid. In this example, the first and second texels may be in the same column of the p by q sub-block of texels. The first and second texels may be the upper-most and lower-most texels in that column of the p by q sub-block of texels. For example, referring to FIGS. 7A-C, the first and second texels may be texels 702A and 702C, respectively. In this case, step S806 need not comprise comparing positions of first and second texels with respect to the columns of the weight grid. Instead, the method may further comprise comparing the positions of the first and third texels with respect to the columns of the weight grid, where the first and third texels are in a different column of the p by q sub-block of texels. That is, the method may further comprise comparing the column (x) coordinate of the first texel with respect to the weight grid to the column (x) coordinate of the third texel with respect to the weight grid. The first and third texels may be in the same row, or a different row, of the p by q sub-block of texels. The first and third texels may be the left-most and right-most texels in their respective row of the p by q sub-block of texels. For example, referring to FIGS. 7A-C, the third texel may be texel 702B.

In yet another example, when the first and second texels are in different columns of the p by q sub-block of texels, step S806 may comprise comparing the positions of first and second texels with respect to the columns of the weight grid. That is, step S806 may comprise comparing the column (x) coordinate of the first texel with respect to the weight grid to the column (x) coordinate of the second texel with respect to the weight grid. In this example, the first and second texels may be in the same row of the p by q sub-block of texels. The first and second texels may be the left-most and right-most texels in that row of the p by q sub-block of texels. For example, referring to FIGS. 7A-C, the first and second texels may be texels 702A and 702C, respectively. In this case, step S806 need not comprise comparing the positions of first and second texels with respect to the rows of the weight grid. Instead, the method may further comprise comparing the positions of the first and third texels with respect to the rows of the weight grid, where the first and third texels are in a different row of the p by q sub-block of texels. That is, the method may further comprise comparing the row (y) coordinate of the first texel with respect to the weight grid to the row (y) coordinate of the third texel with respect to the weight grid. The first and third texels may be in the same column, or a different column, of the p by q sub-block of texels. The first and third texels may be the upper-most and lower-most texels in their respective column of the p by q sub-block of texels. For example, referring to FIGS. 7A-C, the third texel may be texel 702C.

Step S806 is performed in order to determine whether the positions of the first and second texels with respect to the rows and/or columns of the weight grid are between: the upper-most and lower-most rows of a predetermined number of adjacent rows of the weight grid; and/or the left-most and right-most columns of a predetermined number of adjacent columns of the weight grid.

When the first and second texels are in different rows of the p by q sub-block of texels, it can be determined whether the positions of the first and second texels with respect to the rows of the weight grid are between the upper-most and lower-most rows of a predetermined number of adjacent rows of the weight grid by comparing the integer part of the row (y) coordinate of the first texel to the integer part of the row (y) coordinate of the second texel in order to determine whether those integer parts differ by less than a threshold. When the first and second texels are the upper-most and lower-most texels in their respective column of the p by q sub-block of texels, the predetermined number of adjacent rows of the weight grid may be p rows of the weight grid. In this case, the threshold can be $(p-1)$. In these examples, the first and second texels may be in the same column or different columns of the p by q sub-block of texels.

For example, in the 2 by 2 sub-block of texels (i.e. p=q=2) shown in FIG. 7A, let the first texel be 702A and the second texel be 702D. Using zero indexing, assume that weight 704A has the coordinate position (0,0). In this case, the integer part of the row (y) coordinate of the first texel 702A with respect to the weight grid will be 0 (as it is positioned between the $0^{th}$ and $1^{st}$ rows of weights), and the integer part of the row (y) coordinate of the second texel 702D with respect to the weight grid will also be 0 (as it is also positioned between the $0^{th}$ and $1^{st}$ rows of weights). In this example, the difference between the integer parts of the row (y) coordinates of the first and second texels is 0 (e.g. $0-0=0$), which is less than the threshold of 1 (where $(p-1)=(2-1)=1$), and so it can be determined that those texels are positioned between the upper-most and lower-most rows of 2 adjacent rows (where p=2) of the weight grid. In this example, the upper-most row of said adjacent rows is the row including weights 704A-C and the lower-most row of said adjacent rows is the row including weights 704D-F. By performing an analogous comparison, the same can be said of texels 702A and 702D in FIG. 7B.

By contrast, in FIG. 7C, the integer part of the row (y) coordinate of the first texel 702A with respect to the weight grid will be 0 (as it is positioned between the $0^{th}$ and $1^{st}$ rows of weights), and the integer part of the row (y) coordinate of the second texel 702D with respect to the weight grid will be 1 (as it is positioned between the $1^{st}$ and $2^{nd}$ rows of weights). In this example, the difference between the integer parts of the row (y) coordinates of the first and second texels is 1 (e.g. $1-0=1$), which is equal to the threshold of 1 (where $(p-1)=(2-1)=1$), and so it can be determined that those texels are not positioned between the upper-most and lower-most rows of 2 adjacent rows (where p=2) of the weight grid. In this example, the upper-most row is the row including weights 704A-C and the lower-most row is the row including weights 704D-F.

As will be appreciated from the preceding paragraphs, in the special case where p=2, it can be determined whether the positions of the first and second texels with respect to the rows of the weight grid are between the upper-most and lower-most rows of 2 adjacent rows of the weight grid by comparing only the least significant bit of the integer part of the row (y) coordinate of each of the first and second texels with respect to the weight grid. That is, in this special case, step S808 may comprise determining whether the least significant bit of the integer part of the row (y) coordinate of the first texel defined with respect to the weight grid matches (e.g. is equal to) the least significant bit of the integer part of the row (y) coordinate of the second texel defined with respect to the weight grid. If they do match, it can be determined that the positions of the first and second texels with respect to the rows of the weight grid are between the upper-most and lower-most rows of 2 adjacent rows of the weight grid. If they do not match, it can be determined that the positions of the first and second texels with respect to the rows of the weight grid are not between the upper-most and lower-most rows of 2 adjacent rows of the weight grid. The decoder 500 may comprises an XOR gate configured to perform said bit comparison. Hence, said comparison can be performed very "cheaply" in terms of hardware usage and power consumption.

It is to be understood that the predetermined number of adjacent rows of the weight grid need not be p. For example, the first and second texels may not be upper-most and lower-most texels in their respective column of the p by q sub-block of texels. That is, one or both of first and second texels may be positioned between the upper-most and lower-most texels in their respective column of the p by q sub-block of texels. In this case, the predetermined number of adjacent rows of the weight grid may be fewer than p. Said predetermined number may be determined such that when the first and second texels are positioned between that predetermined number of adjacent rows of the weight grid, it can be inferred that the upper-most and lower-most texels in their respective column of the p by q sub-block of texels will be between the upper-most and lower-most rows of p adjacent rows of the weight grid. This may be the case in examples where p>>2.

When the first and second texels are in different columns of the p by q sub-block of texels, it can be determined whether the positions of the first and second texels with respect to the columns of the weight grid are between the left-most and right-most columns of a predetermined number of adjacent columns of the weight grid by comparing the integer part of the column (x) coordinate of the first texel to the integer part of the column (x) coordinate of the second texel in order to determine whether those integer parts differ by less than a threshold. When the first and second texels are the left-most and right-most texels in their respective row of the p by q sub-block of texels, the predetermined number of adjacent columns of the weight grid may be q columns of the weight grid. In this case, the threshold can be (q−1). In these examples, the first and second texels may be in the same row or different rows of the p by q sub-block of texels.

For example, in the 2 by 2 sub-block of texels (i.e. p=q=2) shown in FIG. 7A, let the first texel be 702A and the second texel be 702D. Using zero indexing, assume that weight 704A has the coordinate position (0,0). In this case, the integer part of the column (x) coordinate of the first texel 702A with respect to the weight grid will be 0 (as it is positioned between the $0^{th}$ and $1^{st}$ columns of weights), and the integer part of the column (x) coordinate of the second texel 702D with respect to the weight grid will also be 0 (as it is also positioned between the $0^{th}$ and $1^{st}$ columns of weights). In this example, the difference between the integer parts of the column (x) coordinates of the first and second texels is 0 (e.g. 0−0=0), which is less than the threshold of 1 (where (q−1)=(2-1)=1), and so it can be determined that those texels are positioned between the left-most and right-most columns of 2 adjacent columns (where q=2) of the weight grid. In this example, the left-most column of said adjacent columns is the column including weights 704A, D,G and the right-most column of said adjacent columns is the column including weights 704B,E,H. By performing an analogous comparison, the same can be said of texels 702A and 702D in FIG. 7C.

By contrast, in FIG. 7B, the integer part of the column (x) coordinate of the first texel 702A with respect to the weight grid will be 0 (as it is positioned between the $0^{th}$ and $1^{st}$ columns of weights), and the integer part of the column (x) coordinate of the second texel 702D with respect to the weight grid will be 1 (as it is positioned between the $1^{st}$ and $2^{nd}$ columns of weights). In this example, the difference between the integer parts of the column (x) coordinates of the first and second texels is 1 (e.g. 1−0=1), which is equal to the threshold of 1 (where (q−1)=(2-1)=1), and so it can be determined that those texels are not positioned between the left-most and right-most columns of 2 adjacent columns (where q=2) of the weight grid. In this example, the left-most column of said adjacent columns is the column including weights 704A,D,G and the right-most column of said adjacent columns is the column including weights 704B,E, H.

As will be appreciated from the preceding paragraphs, in the special case where q=2, it can be determined whether the positions of the first and second texels with respect to the columns of the weight grid are between the left-most and right-most columns of 2 adjacent columns of the weight grid by comparing only the least significant bit of the integer part of the column (x) coordinate of each of the first and second texels with respect to the weight grid. That is, in this special case, step S808 may comprise determining whether the least significant bit of the integer part of the column (x) coordinate of the first texel defined with respect to the weight grid matches (e.g. is equal to) the least significant bit of the integer part of the column (x) coordinate of the second texel defined with respect to the weight grid. If they do match, it can be determined that the positions of the first and second texels with respect to the columns of the weight grid are between the left-most and right-most columns of 2 adjacent columns of the weight grid. If they do not match, it can be determined that the positions of the first and second texels with respect to the columns of the weight grid are not between the left-most and right-most columns of 2 adjacent columns of the weight grid. The decoder 500 may comprises an XOR gate configured to perform said bit comparison. Hence, said comparison can be performed very "cheaply" in terms of hardware usage and power consumption.

It is to be understood that the predetermined number of adjacent columns of the weight grid need not be q. For example, the first and second texels may not be the left-most and right-most texels in their respective row of the p by q sub-block of texels. That is, one or both of first and second texels may be positioned between the left-most and right-most texels in their respective row of the p by q sub-block of texels. In this case, the predetermined number of adjacent columns of the weight grid may be fewer than q. Said predetermined number may be determined such that when the first and second texels are positioned between that predetermined number of adjacent columns of the weight grid, it can be inferred that the left-most and right-most texels in their respective row of the p by q sub-block of texels will be between the left-most and right-most columns of q adjacent columns of the weight grid. This may be the case in examples where q>>2.

It is also to be understood that the same principles can be applied to perform comparisons between the positions of first and third texels of the p by q sub-block of texels in order to determine whether the positions of said first and third texels with respect to the rows and/or columns of the weight grid are between: the upper-most and lower-most rows of a predetermined number of adjacent rows of the weight grid; and/or the left-most and right-most columns of a predetermined number of adjacent columns of the weight grid. Said comparisons will not be described in detail herein—for conciseness.

When it is determined, in step S808, that the positions of the first and second texels with respect to the rows and/or columns of the weight grid are between: the upper-most and lower-most rows of a predetermined number of adjacent rows of the weight grid; and/or the left-most and right-most columns of a predetermined number of adjacent columns of the weight grid: then in step S810 fewer than (p+1)(q+1) weights can be extracted from the weight grid (e.g. from the first plurality of weights of the first plane of the weight grid, when the data block utilises single-plane mode). Steps S808 and S810 may be performed by the weight decode unit 506 of decoder 500. The extracted weights may subsequently be used to decode the plurality of texels. In particular, each of the extracted weights may subsequently contribute to an interpolate weight for at least one of the plurality of texels.

As described herein, the block of texture data 510 stores the weight data representing the weight grid in a one-dimensional bit vector, with the weights of the weight grid being encoded in a row-by-row pattern. For this reason, in order to extract said fewer than (p+1)(q+1) weights from the weight grid, it is most efficient for the decoder 500 (e.g. the weight decode unit 506 of decoder 500) to independently operate on each of the rows of weights of interest from which weights are to be extracted. For example, the decoder may operate on each of said rows of interest in parallel using independent decoding hardware, or operate on each of said rows of interest in series using the same decoding hardware. Each instance of said decoding hardware may be configured to: (i) determine how far it needs to shift the one-dimensional bit vector encoding the weight data in order to access the encoded row of weights of interest; (ii) shift the one-dimensional bit vector by the determined amount; and (iii) extract the selected weights from that encoded row of weights. For example, in step (iii) the entire encoded row of weights being operated on may be decoded (e.g. by decoding one or more blocks of ISE encoded weight data), with only the selected weights being read out from the decoded weight data for subsequent use (e.g. subsequent use in decoding the plurality of texels). It is to be understood that an encoded row of weights may not necessarily fit neatly into a single ISE block. For example, if a weight grid is four weights wide and trits are used to encode the weights, then the first ISE block will encode five weights, four weights from the first row of the weight grid and one weight from the second row of the weight grid. The other weights of the second row of the weight grid will be encoded in the second ISE block, along with the first two weights of the third row of the weight grid, etc. Hence, more than one ISE blocks may need to be decoded to access all of the weights of an encoded row of weights.

In a first example, when the first and second texels are in different rows and columns of the p by q sub-block of texels, and it is determined that the positions of the first and second texels with respect to the rows of the weight grid are between the upper-most and lower-most rows of the predetermined number of adjacent rows of the weight grid (as defined herein), and the positions of the first and second texels with respect to the columns of the weight grid are between the left-most and right-most columns of the predetermined number of adjacent columns of the weight grid (as defined herein), the decoder can operate (e.g. independently) on fewer than (p+1) rows (e.g. p rows) of weights from the weight grid, and extract fewer than (q+1) weights (e.g. q weights) of the first plurality of weights from each of said fewer than (p+1) rows of weights. For example, step S810 can comprise extracting just pq weights in this example, rather than (p+1)(q+1) weights. This can reduce the power consumption of the decoder 500.

Similarly, in a second example, when: (i) the first and second texels are in different rows of the p by q sub-block of texels, and it is determined that the positions of the first and second texels with respect to the rows of the weight grid are between the upper-most and lower-most rows of the predetermined number of adjacent rows of the weight grid (as defined herein); and (ii) the first and third texels are in different columns of the p by q sub-block of texels, and it is determined that the positions of the first and third texels with respect to the columns of the weight grid are between the left-most and right-most columns of the predetermined number of adjacent columns of the weight grid (as defined herein): the decoder can operate (e.g. independently) on fewer than (p+1) rows (e.g. p rows) of weights from the weight grid, and extract fewer than (q+1) weights (e.g. q weights) of the first plurality of weights from each of said fewer than (p+1) rows of weights. For example, step S810 can comprise extracting just pq weights in this example, rather than (p+1)(q+1) weights. This can reduce the power consumption of the decoder 500.

It is to be understood that, in examples where p and/or q are greater than 2, the number of weights to be extracted from the weight grid may even be fewer than pq. In an example, for a 3×3 sub-block of texels (i.e. p=q=3), it could be determined that all of the texels of that 3×3 sub-block of texels are positioned between 2 adjacent rows and 2 adjacent columns of the weight grid. This might occur when the weight grid is very significantly sparser than the block footprint. In this example, it can be determined that just 4 weights (i.e. (p−1)(q−1) weights, where p=q=3) weights are to be extracted from the weight grid. In another example, for a 4×4 sub-block of texels (i.e. p=q=4), it could be determined that all of the texels of that 4×4 sub-block of texels are positioned between 2 adjacent rows and 2 adjacent columns of the weight grid. This might occur when the weight grid is extremely significantly sparser than the block footprint. In this example, it can be determined that just 4 weights (i.e. (p−2)(q−2) weights, where p=q=4) weights are to be extracted from the weight grid. It will be appreciated that many more examples could be given where the number of weights to be extracted from the weight grid is fewer than pq.

Said first and second examples can be understood further with reference to FIG. 7A. As explained above, in FIG. 7A, all of the texels 702A-D of the 2 by 2 sub-block of texels are positioned between 2 adjacent rows and 2 adjacent columns of the weight grid. As such, the decoder can operate (e.g. independently) on 2 (where p=2) rows of weights from the weight grid (i.e. the rows including weights 704A-C, and 704D-F, respectively), and extract 2 (where q=2) weights of the first plurality of weights from each of said 2 rows of weights (i.e. weights 704A-B and 704D-E, respectively). That is, the decoder need not extract weights 704C or 704F from the rows of weights it has operated on, and need not operate on the row including weights 704G-1 at all.

It is to be understood that, once it has been determined how many weights will be extracted, the row and column positions of the weights to be extracted can be determined in dependence on the positions of one or more of the plurality of texels of the p by q sub-block of texels with respect to the weight grid. For example, if the upper-left-most texel in the p by q sub-block of texels has a coordinate position (x,y) with respect to the weight grid, and it is determined that all of the texels of the p by q sub-block of texels are positioned between p adjacent rows and q adjacent columns of the weight grid, then it can be determined that the pq weights to be extracted are those with coordinate positions from (floor (x), floor(y)) to ((floor(x)+(q−1), floor(y)+(p−1)).

In a third example, when the first and second texels are in different rows of the p by q sub-block of texels, and it is determined that the positions of the first and second texels with respect to the rows of the weight grid are between the upper-most and lower-most rows of the predetermined number of adjacent rows of the weight grid (as defined herein), the decoder can operate (e.g. independently) on fewer than (p+1) rows (e.g. p rows) of weights from the weight grid, and extract (q+1) weights of the first plurality of weights from each of said fewer than (p+1) rows of weights. For example, step S810 can comprise extracting just p(q+1) weights in this example, rather than (p+1)(q+1) weights. This can reduce the power consumption of the decoder 500.

Said third example can be understood further with reference to FIG. 7B. As explained above, in FIG. 7B the 2 rows of texels of the 2 by 2 sub-block of texels are positioned between 2 adjacent rows of the weight grid, although the 2 columns of texels of the 2 by 2 sub-block of texels are not positioned between 2 adjacent columns of the weight grid. As such, the decoder can operate (e.g. independently) on 2 (where p=2) rows of weights from the weight grid (i.e. the rows including weights 704A-C, and 704D-F, respectively), and extract 3 (where (q+1)=3) weights of the first plurality of weights from each of said 2 rows of weights (i.e. weights 704A-C and 704D-F, respectively). That is, the decoder need not operate on the row including weights 704G-1 at all.

It is to be understood that, once it has been determined how many weights will be extracted, the row and column positions of the weights to be extracted can be determined in dependence on the positions of one or more of the plurality of texels of the p by q sub-block of texels with respect to the weight grid. For example, if the upper-left-most texel in the p by q sub-block of texels has a coordinate position (x,y) with respect to the weight grid, and it is determined that all of the texels of the p by q sub-block of texels are positioned between p adjacent rows and (q+1) adjacent columns of the weight grid, then it can be determined that the p(q+1) weights to be extracted are those with coordinate positions from (floor(x), floor(y)) to ((floor(x)+q), floor(y)+(p−1)).

In a fourth example, when the first and second texels are in different columns of the p by q sub-block of texels, and it is determined that the positions of the first and second texels with respect to the columns of the weight grid are between the left-most and right-most columns of the predetermined number of adjacent columns of the weight grid (as defined herein), the decoder can operate (e.g. independently) on (p+1) rows of the weight grid, and extract fewer than (q+1) weights (e.g. q weights) of the first plurality of weights from each of said (p+1) rows of weights. For example, step S810 can comprise extracting just (p+1)q weights in this example, rather than (p+1)(q+1) weights. This can reduce the power consumption of the decoder 500.

Said fourth example can be understood further with reference to FIG. 7C. As explained above, in FIG. 7C the 2 columns of texels of the 2 by 2 sub-block of texels are positioned between 2 adjacent columns of the weight grid, although the 2 rows of texels of the 2 by 2 sub-block of texels are not positioned between 2 adjacent rows of the weight grid. As such, the decoder can operate (e.g. independently) on 3 (where (p+1)=3) rows of weights from the weight grid (i.e. the rows including weights 704A-C, 704D-F and 704G-1, respectively), and extract 2 (where q=2) weights of the first plurality of weights from each of said 3 rows of weights (i.e. weights 704A-B, 704D-E and 704G-H, respectively). That is, the decoder need not extract weights 704C, 704F or 704I from the rows of weights it has operated on.

It is to be understood that, once it has been determined how many weights will be extracted, the row and column positions of the weights to be extracted can be determined in dependence on the positions of one or more of the plurality of texels of the p by q sub-block of texels with respect to the weight grid. For example, if the upper-left-most texel in the p by q sub-block of texels has a coordinate position (x,y) with respect to the weight grid, and it is determined that all of the texels of the p by q sub-block of texels are positioned between (p+1) adjacent rows and q adjacent columns of the weight grid, then it can be determined that the (p+1)q weights to be extracted are those with coordinate positions from (floor(x), floor(y)) to (floor(x)+(q−1), floor(y)+p).

It is to be understood that, if it is determined that the positions of the first and second texels with respect to the rows and/or columns of the weight grid are not between: the upper-most and lower-most rows of a predetermined number of adjacent rows of the weight grid (as defined herein); or the left-most and right-most columns of a predetermined number of adjacent columns of the weight grid (as defined herein) (e.g. as would be the case for the sub-block of texels shown in FIG. 6): then (p+1)(q+1) weights can be extracted from the weight grid (e.g. from the first plurality of weights of the first plane of the weight grid, when the data block utilises single-plane mode).

In step S812, the plurality of texels of the p by q sub-block of texels are decoded in dependence on the extracted weights.

Step S812 may comprise, for each of the plurality of texels, interpolating between a plurality of the extracted weights to determine an interpolate weight for that texel. Each of the extracted weights may be involved in at least one of said interpolations. That is, each of the extracted weights may be used in the interpolation performed for at least one of the plurality of texels. In other words, each of the extracted weights may contribute to the respective interpolate weight for at least one of the plurality of texels. This step can be performed by the weight decode unit 506 of decoder 500. For example, referring to FIG. 7A, interpolant weights (shown in solid black, but not labelled for each of illustration) for each of texels 702A-D can be determined by performing bilinear interpolations between the extracted weights 704A,B,D,E. Referring to FIG. 7B, interpolant weights for texels 702A and 702C can be determined by performing bilinear interpolations between the extracted weights 704A,B,D,E, whilst interpolant weights for texels 702B and 702D can be determined by performing bilinear interpolations between the extracted weights 704B,C,E,F. Referring to FIG. 7C, interpolant weights for texels 702A and 702B can be determined by performing bilinear interpolations between the extracted weights 704A,B,D,E, whilst interpolant weights for texels 702C and 702D can be determined by performing bilinear interpolations between the extracted weights 704D,E,G,H. The contribution of each extracted weight to the interpolant weight for a texel of the plurality of texels may be dependent on the coordinate position of that texel that is defined with respect to the dimensions of weight grid relative to the coordinate positions of the extracted weights.

Step S812 may also comprise determining a colour value for each of the plurality of texels being decoded by interpolating between a respective pair of colour endpoints using the respective interpolate weight for each of the plurality of texels. This step can be performed by the interpolator unit(s) 508 of decoder 500. Examples of interpolating between a respective pair of colour endpoints using the interpolate weight for a texel are described above—and so are not repeated here for conciseness.

As above, the examples given herein are described with reference to block of texture data 510 that does not use dual-plane mode. That is, in these examples, the weight grid comprises a first plurality of weights in a first plane. It is to be understood that when dual-plane mode is used, steps S802 to S808 are unaffected, but in step S810 the same number of weights are extracted from a second plurality of weights in a second plane of the weight grid as are extracted from the first plurality of weights in the first plane of the weight grid. That is, in step S810, when dual-plane mode is used, the method would comprise extracting fewer than (p+1)(q+1) weights of the first plurality of weights and fewer than (p+1)(q+1) weights of the second plurality of weights in response to determining, in step S808, that the positions of the first and second texels with respect to the rows and/or columns of the weight grid are between the upper-most and lower-most rows of a predetermined number of adjacent rows; and/or the left-most and right-most columns of a predetermined number of adjacent columns of the weight grid. In step S812, the fewer than (p+1)(q+1) weights extracted from the first plurality of weights can be used to determine a respective first interpolate weight for each of the plurality of texels being decoded, whilst the fewer than (p+1)(q+1) weights extracted from the second plurality of weights can be used to determine a respective second interpolate weight for each of the plurality of texels being decoded. The first interpolant weight for a texel can be used to interpolate between endpoints in a first colour channel (e.g. A channel in RGBA colour space) of a colour endpoint pair, whilst the second interpolant weight for that texel can be used to interpolate between endpoints in the other colour channels (e.g. RGB channels in RGBA colour space) of that colour endpoint pair—so as to determine a colour for that texel.

Figure 9:
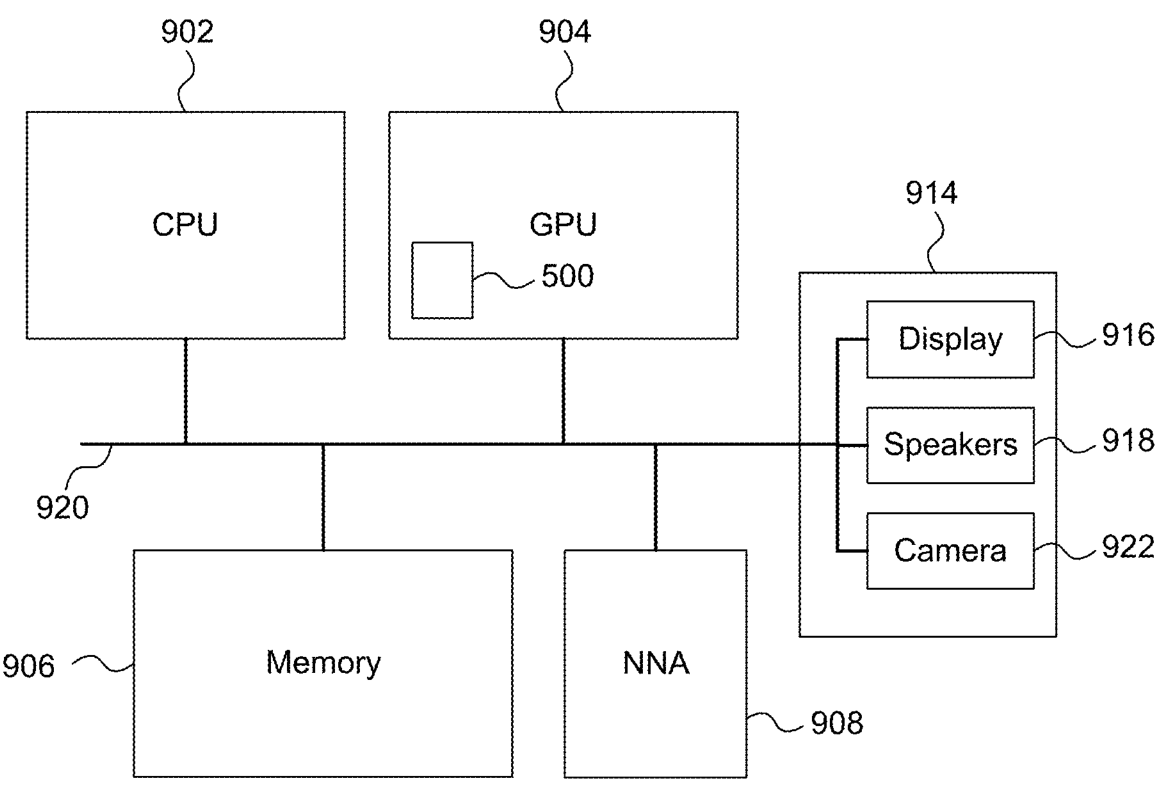
FIG. 9 shows a computer system in which a decoder is implemented.

FIG. 9 shows a computer system in which the decoder described herein may be implemented. The computer system comprises a CPU 902, a GPU 904, a memory 906, a neural network accelerator (NNA) 908 and other devices 914, such as a display 916, speakers 918 and a camera 922. A decoder 500 according to the principles described herein can be implemented (e.g. in hardware) within the GPU 904. In other examples, one or more of the depicted components may be omitted from the system, and/or the decoder 500 may be implemented in hardware between the memory 906 (e.g. that stores the encoded texture data) and the GPU 904. The components of the computer system can communicate with each other via a communications bus 920.

The decoder of FIG. 5 is shown as comprising a number of functional blocks. This is schematic only and is not intended to define a strict division between different logic elements of such entities. Each functional block may be provided in any suitable manner. It is to be understood that intermediate values described herein as being formed by a decoder need not be physically generated by the decoder at any point and may merely represent logical values which conveniently describe the processing performed by the decoder between its input and output.

The decoder described herein may be embodied in hardware on an integrated circuit. The decoder described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a decoder configured to perform any of the methods described herein, or to manufacture a decoder comprising any apparatus described herein. An integrated circuit definition dataset may be, for example, an integrated circuit description.

Therefore, there may be provided a method of manufacturing, at an integrated circuit manufacturing system, a decoder as described herein. Furthermore, there may be provided an integrated circuit definition dataset that, when processed in an integrated circuit manufacturing system, causes the method of manufacturing a decoder to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a decoder will now be described with respect to FIG. 10.

Figure 10:
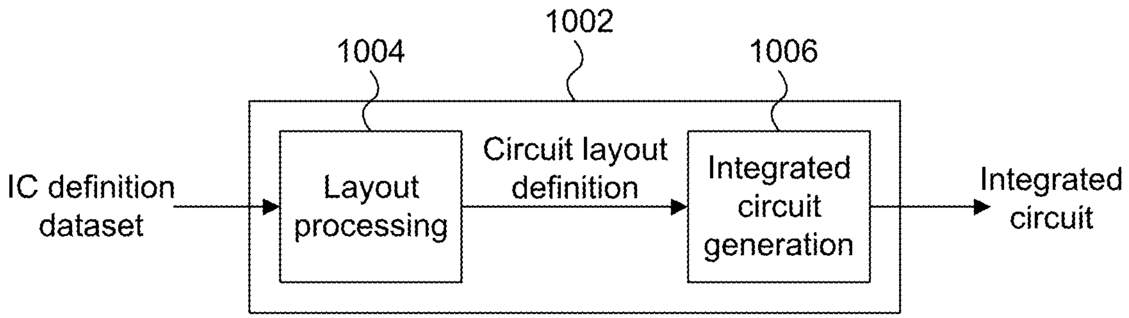
FIG. 10 shows an integrated circuit manufacturing system for generating an integrated circuit embodying a graphics processing system.

FIG. 10 shows an example of an integrated circuit (IC) manufacturing system 1002 which is configured to manufacture a decoder as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a decoder as described in any of the examples herein), process the IC definition dataset, and generate an IC according to the IC definition dataset (e.g. which embodies a decoder as described in any of the examples herein). The processing of the IC definition dataset configures the IC manufacturing system 1002 to manufacture an integrated circuit embodying a decoder as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a decoder without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 10 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 10, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A decoder configured to decode a plurality of texels of a p by q sub-block of texels from a block of texture data encoded according to the Adaptive Scalable Texture Compression (ASTC) format, the block of texture data representing an n by m block of texels, where p≤n and q≤m, the decoder being configured to:

determine a position of a first texel of the p by q sub-block of texels with respect to the rows and/or columns of a weight grid, the weight grid comprising a first plurality of weights in a first plane, wherein determining the position of the first texel with respect to the rows and/or columns of the weight grid comprises scaling, using a scaling factor, a coordinate position of the first texel that is defined according to the dimensions of the block of texels to a coordinate position for the first texel that is defined with respect to the dimensions of weight grid;

determine a position of a second texel of the p by q sub-block of texels with respect to the rows and/or columns of the weight grid, wherein determining the position of the second texel with respect to the rows and/or columns of the weight grid comprises scaling, using the scaling factor, a coordinate position of the second texel that is defined according to the dimensions of the block of texels to a coordinate position for the second texel that is defined with respect to the dimensions of weight grid;

compare the positions of the first and second texels with respect to the rows and/or columns of the weight grid, wherein comparing the positions of the first and second texels with respect to the rows and/or columns of the weight grid comprises comparing the column (x) and/or row (y) coordinate of the first texel defined with respect to the weight grid to the respective column (x) and/or row (y) coordinate of the second texel defined with respect to the weight grid;

extract fewer than (p+1) (q+1) weights of the first plurality of weights in response to determining that the positions of the first and second texels with respect to the rows and/or columns of the weight grid are between:

the upper-most and lower-most rows of a predetermined number of adjacent rows of the weight grid; and/or the left-most and right-most columns of a predetermined number of adjacent columns of the weight grid; and decode the plurality of texels in dependence on the extracted weights.

2. The decoder of claim 1, wherein the first and second texels are in different rows of the p by q sub-block of texels, and the decoder is further configured to:

determine a position of each of the first and second texels with respect to the rows of the weight grid; and compare the positions the first and second texels with respect to the rows of the weight grid.

3. The decoder of claim 2, the decoder being further configured to, in response to determining that the positions of the first and second texels with respect to the rows of the weight grid are between the upper-most and lower-most rows of a predetermined number of adjacent rows of the weight grid:

operate on fewer than (p+1) rows of weights from the weight grid; and extract the fewer than (p+1) (q+1) weights of the first plurality of weights from said fewer than (p+1) rows of weights.

4. The decoder of claim 3, the decoder being further configured to:

determine a position of a third texel of the p by q sub-block of texels with respect to the columns of the weight grid, wherein the first and third texels are in different columns of the p by q sub-block of texels;

compare the positions the first and third texels with respect to the columns of the weight grid; and in response to determining that the positions of the first and third texels with respect to the columns of the weight grid are between the left-most and right-most columns of a predetermined number of adjacent columns of the weight grid, extract fewer than (q+1) weights of the first plurality of weights from each of said fewer than (p+1) rows of weights.

5. The decoder of claim 4, wherein:

the first and third texels are in the same row or different rows of the p by q sub-block of texels;

the first and third texels are the left-most and right-most texels in their respective row of the p by q sub-block of texels; and the predetermined number of columns of the weight grid is q columns of the weight grid.

6. The decoder of claim 2, wherein:

the first and second texels are in the same column or different columns of the p by q sub-block of texels;

the first and second texels are the upper-most and lower-most texels in their respective column of the p by q sub-block of texels; and the predetermined number of rows of the weight grid is p rows of the weight grid.

7. The decoder of claim 1, wherein the first and second texels are in different columns of the p by q sub-block of texels, and the decoder is further configured to:

determine a position of each of the first and second texels with respect to the columns of the weight grid; and compare the positions of the first and second texels with respect to the columns of the weight grid.

8. The decoder of claim 7, the decoder being further configured to, in response to determining that the positions of the first and second texels with respect to the columns of the weight grid are between the left-most and right-most columns of a predetermined number of adjacent columns of the weight grid:

operate on a plurality of rows of weights from the weight grid; and extract fewer than (q+1) weights of the first plurality of weights from each of said plurality of rows of weights.

9. The decoder of claim 7, wherein:

the first and second texels are in the same row or different rows of the p by q sub-block of texels;

the first and second texels are the left-most and right-most texels in their respective row of the p by q sub-block of texels; and the predetermined number of columns of the weight grid is q columns of the weight grid.

10. The decoder of claim 1, wherein the first and second texel are in different rows of the p by q sub-block of texels and the decoder is configured to compare the row (y) coordinate of the first texel defined with respect to the weight grid to the row (y) coordinate of the second texel defined with respect to the weight grid.

11. The decoder of claim 10, wherein the row (y) coordinate of a texel defined with respect to the weight grid is expressed in a fixed point number format having an integer part and a fractional part, and the decoder is configured to compare the integer part of the row (y) coordinate of the first texel defined with respect to the weight grid to the integer part of the row (y) coordinate of the second texel defined with respect to the weight grid.

12. The decoder of claim 10, wherein p=2, the row (y) coordinate of a texel defined with respect to the weight grid is expressed in a fixed point number format having an integer part and a fractional part, and the decoder is configured to determine that the positions of the first and second texels with respect to the rows of the weight grid are between the upper-most and lower-most rows of 2 adjacent rows of the weight grid by determining whether the least significant bit of the integer part of the row (y) coordinate of the first texel defined with respect to the weight grid matches the least significant bit of the integer part of the row (y) coordinate of the second texel defined with respect to the weight grid.

13. The decoder of claim 1, wherein the first and second texel are in different columns of the p by q sub-block of texels and the decoder is configured to compare the column (x) coordinate of the first texel defined with respect to the weight grid to the column (x) coordinate of the second texel defined with respect to the weight grid.

14. The decoder of claim 13, wherein the column (x) coordinate of a texel defined with respect to the weight grid is expressed in a fixed point number format having an integer part and a fractional part, and the decoder is configured to compare the integer part of the column (x) coordinate of the first texel defined with respect to the weight grid to the integer part of the column (x) coordinate of the second texel defined with respect to the weight grid.

15. The decoder of claim 13, wherein q=2, the column (x) coordinate of a texel defined with respect to the weight grid is expressed in a fixed point number format having an integer part and a fractional part, and the decoder is configured to determine that the positions of the first and second texels with respect to the columns of the weight grid are between the left-most and right-most columns of 2 adjacent columns of the weight grid by determining whether the least significant bit of the integer part of the column (x) coordinate of the first texel defined with respect to the weight grid matches the least significant bit of the integer part of the column (x) coordinate of the second texel defined with respect to the weight grid.

16. The decoder of claim 1, wherein the weight grid comprises a second plurality of weights in a second plane, and the decoder is configured to:

extract fewer than (p+1) (q+1) weights of the second plurality of weights in response to determining that the positions of the first and second texels with respect to the rows and/or columns of the weight grid are between:

the upper-most and lower-most rows of a predetermined number of adjacent rows; and/or the left-most and right-most columns of a predetermined number of adjacent columns of the weight grid.

17. A method of decoding a plurality of texels of a p by q sub-block of texels from a block of texture data encoded according to the Adaptive Scalable Texture Compression (ASTC) format, the block of texture data representing an n by m block of texels, where p≤n and q≤m, the method comprising:

determining a position of a first texel of the p by q sub-block of texels with respect to the rows and/or columns of a weight grid, the weight grid comprising a first plurality of weights in a first plane, wherein determining the position of the first texel with respect to the rows and/or columns of the weight grid comprises scaling, using a scaling factor, a coordinate position of the first texel that is defined according to the dimensions of the block of texels to a coordinate position for the first texel that is defined with respect to the dimensions of weight grid;

determining a position of a second texel of the p by q sub-block of texels with respect to the rows and/or columns of the weight grid, wherein determining the position of the second texel with respect to the rows and/or columns of the weight grid comprises scaling, using the scaling factor, a coordinate position of the second texel that is defined according to the dimensions of the block of texels to a coordinate position for the second texel that is defined with respect to the dimensions of weight grid;

comparing the positions of the first and second texels with respect to the rows and/or columns of the weight grid, wherein comparing the positions of the first and second texels with respect to the rows and/or columns of the weight grid comprises comparing the column (x) and/or row (y) coordinate of the first texel defined with respect to the weight grid to the respective column (x) and/or row (y) coordinate of the second texel defined with respect to the weight grid;

extracting fewer than (p+1) (q+1) weights of the first plurality of weights in response to determining that the positions of the first and second texels with respect to the rows and/or columns of the weight grid are between:

the upper-most and lower-most rows of a predetermined number of adjacent rows of the weight grid; and/or the left-most and right-most columns of a predetermined number of adjacent columns of the weight grid; and decoding the plurality of texels in dependence on the extracted weights.

18. A non-transitory computer readable storage medium having stored thereon an integrated circuit definition dataset that, when processed in an integrated circuit manufacturing system, configures the integrated circuit manufacturing system to manufacture a decoder configured to decode a plurality of texels of a p by q sub-block of texels from a block of texture data encoded according to the Adaptive Scalable Texture Compression (ASTC) format, the block of texture data representing an n by m block of texels, where p≤n and q≤m, the decoder being configured to:

determine a position of a first texel of the p by q sub-block of texels with respect to the rows and/or columns of a weight grid, the weight grid comprising a first plurality of weights in a first plane, wherein determining the position of the first texel with respect to the rows and/or columns of the weight grid comprises scaling, using a scaling factor, a coordinate position of the first texel that is defined according to the dimensions of the block of texels to a coordinate position for the first texel that is defined with respect to the dimensions of weight grid;

determine a position of a second texel of the p by q sub-block of texels with respect to the rows and/or columns of the weight grid, wherein determining the position of the second texel with respect to the rows and/or columns of the weight grid comprises scaling, using the scaling factor, a coordinate position of the second texel that is defined according to the dimensions of the block of texels to a coordinate position for the second texel that is defined with respect to the dimensions of weight grid;

compare the positions of the first and second texels with respect to the rows and/or columns of the weight grid, wherein comparing the positions of the first and second texels with respect to the rows and/or columns of the weight grid comprises comparing the column (x) and/or row (y) coordinate of the first texel defined with respect to the weight grid to the respective column (x) and/or row (y) coordinate of the second texel defined with respect to the weight grid;

extract fewer than (p+1) (q+1) weights of the first plurality of weights in response to determining that the positions of the first and second texels with respect to the rows and/or columns of the weight grid are between:

the upper-most and lower-most rows of a predetermined number of adjacent rows of the weight grid; and/or the left-most and right-most columns of a predetermined number of adjacent columns of the weight grid; and decode the plurality of texels in dependence on the extracted weights.

* * * * *